United States Patent
Okamura et al.

(10) Patent No.: US 6,467,277 B2
(45) Date of Patent: Oct. 22, 2002

(54) COLD ACCUMULATING MATERIAL, METHOD OF MANUFACTURING THE SAME AND REFRIGERATOR USING THE MATERIAL

(75) Inventors: Masami Okamura; Tomohisa Arai, both of Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/906,673

(22) Filed: Jul. 18, 2001

(65) Prior Publication Data
US 2002/0026799 A1 Mar. 7, 2002

(30) Foreign Application Priority Data
Jul. 18, 2000 (JP) .................................. 2000-217810
Dec. 19, 2000 (JP) .................................. 2000-385757

(51) Int. Cl.$^7$ .............................. F25B 9/00; F28D 17/00; C09K 5/00
(52) U.S. Cl. ..................................... 62/6; 165/4; 252/67
(58) Field of Search ................... 62/6; 165/4; 148/301; 252/67, 70

(56) References Cited

U.S. PATENT DOCUMENTS

| | | | |
|---|---|---|---|
| 5,186,765 A | * | 2/1993 | Arai et al. ................... 148/301 |
| 5,338,371 A | * | 8/1994 | Nakayama et al. ......... 148/101 |
| 5,593,517 A | * | 1/1997 | Saito et al. .................. 148/301 |
| 6,003,320 A | * | 12/1999 | Okamura et al. ................ 62/6 |
| 6,022,486 A | * | 2/2000 | Tokai et al. .................... 252/67 |
| 6,363,727 B1 | * | 4/2002 | Hashimoto et al. ............... 62/6 |

OTHER PUBLICATIONS

Numazawa et al., "New Oxide Magnetic Material for Sub–4 Cryocoolers", Summary Text at p. 50 of 62$^{nd}$ Meeting on Cryogenics and Superconductivity held on May 29–31, 2000, 3 pages.

Numazawa et al., "Oxide Magnetic Materials for Regenerator," Summary Text at p. 168 of 63$^{rd}$ Meeting on Cryogenics and Superconductivity held on Oct. 31, 2000—Nov. 2, 2000, 3 pages.

* cited by examiner

*Primary Examiner*—William C. Doerrler
(74) *Attorney, Agent, or Firm*—Foley & Lardner

(57) ABSTRACT

A cold accumulating material comprising a number of magnetic particles mainly composed of oxide, wherein an average value of equivalent circle diameters of crystal grains constituting the magnetic particles is 0.3–20 μm. It is preferable that an area ratio of the crystal grains each having an equivalent circle diameter of 50 μm or more is 10% or less with respect to whole crystal grains constituting the magnetic particle. According to the above structure, there can be provided a cold accumulating material which is free from being finely pulverized, and is excellent in thermal shock resistance and durability, and capable of exhibiting a significant refrigerating performance at low temperature range for a long period of time in a stable condition.

17 Claims, 10 Drawing Sheets

D: EQUIVALENT DIAMETER=2(A/π)$^{1/2}$
A: CROSS-SECTIONAL AREA OR EXPOSED AREA OF CRYSTAL GRAIN

SEM-IMAGE (SURFACE PORTION) OF COLD
ACCUMULATING MATERIAL MANUFACTURED
THROUGH ROLLING GRANULATION METHOD

ENLARGED SEM-IMAGE (CENTER PORTION) OF
COLD ACCUMULATING MATERIAL MANUFACTURED
THROUGH ROLLING GRANULATION METHOD

SEM-IMAGE (SECTIONAL AREA PORTION) OF
COLD ACCUMULATING MATERIAL MANUFACTURED
THROUGH ROLLING GRANULATION METHOD

ENLARGED SEM-IMAGE (PERIPHERAL SECTIONAL AREA)
OF COLD ACCUMULATING MATERIAL MANUFACTURED
THROUGH ROLLING GRANULATION METHOD

SEM-IMAGE (SURFACE PORTION) OF COLD
ACCUMULATING MATERIAL MANUFACTURED
THROUGH PLASMA SPHEROIDIZING METHOD

ENLARGED SEM-IMAGE (CENTER PORTION) OF
COLD ACCUMULATING MATERIAL MANUFACTURED
THROUGH PLASMA SPHEROIDIZING METHOD

SEM-IMAGE (SECTIONAL AREA PORTION) OF
COLD ACCUMULATING MATERIAL MANUFACTURED
THROUGH PLASMA SPHEROIDIZING METHOD

ENLARGED SEM-IMAGE (PERIPHERAL SECTIONAL AREA)
OF COLD ACCUMULATING MATERIAL MANUFACTURED
THROUGH PLASMA SPHEROIDIZING METHOD

D: EQUIVALENT DIAMETER=$2(A/\pi)^{1/2}$
A: CROSS-SECTIONAL AREA OR EXPOSED AREA OF CRYSTAL GRAIN

COLD ACCUMULATING MATERIAL, METHOD OF MANUFACTURING THE SAME AND REFRIGERATOR USING THE MATERIAL

BACKGROUND OF THE INVENTION

1. Field of the Invention

The present invention relates to a cold accumulating material, a method of manufacturing the material and a cold accumulating type refrigerator using the cold accumulating material, and more particularly to a cold accumulating material which is free from the risk of being pulverized into fine particles, and is excellent in mechanical strength and durability, and capable of exhibiting a significant refrigerating performance at a low temperature region, and relates to a method of manufacturing the cold accumulating material, refrigerator using the cold accumulating material and various application devices using the regenerator.

2. Description of the Related Art

Recently, superconductivity technology has been progressed remarkably and with an expanding application field thereof, development of a small, high performance refrigerator has become indispensable. For such a refrigerator, basic requirements such as light weight, small size and high heat efficiency are demanded, and a small-sized refrigerator has been practically applied to various industrial fields.

For example in a super-conductive MRI apparatus, cryopump and the like, a refrigerator based on such refrigerating cycle as Gifford MacMahon type (GM refrigerator), Starling method, pulse-tube type refrigerator has been used. Further, a magnetic floating (levitating) train absolutely needs a high performance refrigerator for generating magnetic force by using a super-conductive magnet. Further, in recent years, a super-conductive power storage apparatus (SMES) or an in-magnetic-field single crystal pull-up apparatus (magnetic field applied Czochralski) has been provided with a high performance refrigerator as a main component thereof. Further, a development and practical use of the pulse tube type refrigerator has been aggressively advanced, because the pulse tube type refrigerator is expected to attain a high reliability.

In the above described refrigerator, the operating medium such as compressed He gas or the like flows in a specified direction in a regenerator (cold accumulating unit) filled with cold accumulating materials so that the heat energy thereof is supplied to the cold accumulating material. Then, the operating medium expanded here flows in an opposite direction and receives heat energy from the cold accumulating material. As the recuperation effect is improved in this process, the heat efficiency in the operating medium cycle is improved so that a further lower temperature can be realized.

As a cold accumulating material for use in the above-described refrigerator, conventionally Cu, Pb and the like have been used. However, these cold accumulating materials have a very small specific heat in extremely low temperatures below 20 K. Therefore, the aforementioned recuperation effect is not exerted sufficiently, so that even if the refrigerator is cyclically operated under an extremely low temperature, the cold accumulating material cannot accumulate sufficient heat energy, and it becomes impossible for the operating medium to receive the sufficient heat energy. As a result, there is posed a problem of that the refrigerator in which the regenerator (cold accumulating unit) filled with aforementioned cold accumulating material is assembled cannot realize the extremely low temperatures.

For the reason, recently to improve the recuperation effect of the regenerator at extremely low temperature and to realize temperatures nearer absolute zero, use of magnetic cold accumulating material made of intermetallic compound formed from a rare earth element and transition metal element such as $Er_3Ni$, $ErNi$, $ErNi_2$, $HoCu_2$ having a local maximum value of volumetric specific heat and indicating a large volumetric specific heat in an extremely low temperature range of 20 K or less has been considered. By applying the magnetic cold accumulating material to the GM refrigerator, a refrigerating operation to produce an arrival lowest temperature of 4 K is realized.

With the advance of reviews for practically applying the above refrigerator into various refrigerating systems, a technical demand for cooling and refrigerating a large-scaled object under a stable state for a long time has been increased, so that it is required to further improve the refrigerating performance (refrigerating capacity) of the refrigerator.

In order to cope with the above technical demand, there has been tried a countermeasure in which a part of the cold accumulating material composed of conventional metal-type magnetic particles generally used is substituted with an oxide-type magnetic cold accumulating material such as $GdAlO_3$ or the like containing rare earth element, so that a specific heat characteristic of the whole cold accumulating material are suitably controlled thereby to improve the refrigerating capacity.

The magnetic cold accumulating material described above is normally worked and used in a form of spherical-shape having a diameter of about 0.1–0.5 mm for the purpose of smoothly flowing He gas, and for effectively performing the heat exchange with He gas as cooling medium in the refrigerator thereby to stably maintain the heat exchange efficiency. In particular, in a case where the magnetic cold accumulating material (particulate cold accumulating substance) is intermetallic compound containing rare earth element, the particulate cold accumulating substance is worked so as to provide a spherical-shape in accordance with working methods such as centrifugal atomizing method.

However, in the above oxide-type magnetic cold accumulating material, since the oxide substance has a high melting point, it is impossible to work the oxide substance so as to provide spherical shape in accordance with a centrifugal spraying method through which the conventional metal-type magnetic cold accumulating material has been worked. Therefore, the conventional oxide-type magnetic cold accumulating material has been worked and manufactured so as to provide a shape close to sphere in accordance with a method comprising the steps of granulating a fine raw material powder to form granulated particles each having an appropriate size; and sintering the granulated particles.

Further, in a Starling-type refrigerator and a pulse-tube type refrigerator or the like to be operated with a high speed, there has been posed a problem that a pressure loss at the regenerator packed with spherical magnetic cold accumulating particles is disadvantageously increased, so that a sufficient refrigerating capacity cannot be realized. Further, in the GM refrigerator or the like, there has been liable to cause the following disadvantages. Namely, pressure vibrations caused by a highly pressurized He gas, various stresses and impact forces are applied to the magnetic body particles (magnetic cold accumulating particles) during the operation of the refrigerator and the magnetic particles were liable to be further finely pulverized, so that a flow resistance of the cooling medium gas is increased thereby to abruptly lower the heat exchange efficiency.

In particular, in case of the GM refrigerator, a stress caused by reciprocal movement of a displacer (i.e. a piston for compressing the cooling medium) is applied to the cold accumulating material, thus exerting a great influence on the characteristic of the cold accumulating material. Further, at a time of starting the refrigerator, the temperature of the regenerators of the refrigerator rapidly lowered in a short time from a room temperature (RT) to an extremely low temperature close to about 4 K, so that a large thermal shock (heat impact) is applied to the cold accumulating material.

However, in general, the oxide substances exhibit an extreme brittleness, insufficient mechanical strength and a small heat impact resistance, so that the following disadvantageous phenomena are liable to cause. That is, the oxide type cold accumulating material is broken during the operation of the refrigerator, a part of surfaces of the cold accumulating material peels off thereby to generate fine powders. The generated fine powders are liable to damage the seal portions of the refrigerator. As a result, there is posed a problem of remarkably lowering the refrigerating capacity of the refrigerator.

Therefore, in order to improve the mechanical strength of the oxide type cold accumulating material, there has been tried to take a measure so that a crystal structure of the cold accumulating material particles is made fine. However, when the crystal structure becomes fine, the crystal boundaries having a large heat resistance are disadvantageously increased thereby to deteriorate the thermal conductivity of the cold accumulating material. Then, when the thermal conductivity is lowered, the heat exchange between the cold accumulating material and He gas as the cooling medium gas becomes insufficient, so that the cold accumulating function cannot be sufficiently exhibited to a deep inner portion of the cold accumulating material particle, thereby to disadvantageously lower the refrigerating capacity.

Further, particularly in the oxide-type cold accumulating material manufactured by afore-mentioned method comprising the steps of granulating the fine oxide material powder to form granulated particles and then sintering the granulated particles, all of the material components are not molten or dissolved to each other, so that it is difficult to manufacture a completely densified cold accumulating particle. That is, there is manufactured particles formed with fine cracks on the surface of the particles, particles having a coarse surfaces formed by irregularities on the surface of the particles, particles formed with fine pores or voids in the inner portions of the particles. Therefore, due to the pressure vibrations and various stresses applied to the particles during the operation of the refrigerator, a breakage or finely pulverization of the particles are liable to cause from the defectives such as crack, irregularities, pore, void or the like. The generated fine powders are liable to damage the seal portions of the refrigerator. As a result, there is posed a problem of remarkably lowering the refrigerating capacity of the refrigerator.

SUMMARY OF THE INVENTION

The present invention has been achieved to solve the above described problems and an object of the invention is to provide a cold accumulating material which is free from the fear of being finely pulverized, and is excellent in thermal shock resistance and durability, and capable of exhibiting a significant refrigerating performance at an extremely low temperature range for a long period of time in a stable condition, and provide a cold accumulation refrigerator using the same.

In addition, another object of the present invention is to provide an MRI apparatus, a super-conducting magnet for magnetic floating train, a cryopump and an in-magnetic field single crystal pull-up apparatus capable of exerting an excellent performance for a long period of time by using the aforementioned cold accumulation refrigerator.

To achieve the above objects, the cold accumulating material of the present invention comprises a number of magnetic particles mainly composed of oxide wherein an average value of equivalent circle diameters of crystal grains constituting the magnetic particles is 0.3–20 $\mu$m.

In the above cold accumulating material, it is preferable that an area ratio of the crystal grains each having an equivalent circle diameter of 50 $\mu$m or more is 10% or less with respect to whole crystal grains constituting the magnetic particle.

Further, in the above cold accumulating material, it is preferable that the magnetic particles are composed of sintered bodies of granulated grains and sintering density of the sintered bodies is 86–99.8%. It is also preferable that the magnetic particles contain at least one element selected from the group consisting of Y, Mg, Al, Ca and rare earth elements in a range of 0.5–15 wt % calculated as oxide thereof, the selected elements being different from elements constituting the magnetic particles.

Furthermore, in the above cold accumulating material, it is also preferable that a ratio of the magnetic particles each of which surface is formed with at least two cracks each having a length of 10 $\mu$m or more is 20% or less with respect to whole number of the magnetic particles.

Still further, in the above cold accumulating material, it is also preferable that a ratio of the magnetic particles each of which surface roughness in terms of maximum height (Rmax) is 10 $\mu$m or more is 30% or less with respect to whole number of the magnetic particles.

Further, in the above cold accumulating material, it is also preferable that a ratio of the magnetic particle in which void or pore having a maximum width of 20 $\mu$m or more exist is 40% or less with respect to whole number of the magnetic particles.

Furthermore, in the above cold accumulating material, it is also preferable to control so that the magnetic particles contain 3 ppm-2 wt % of silicon, sodium and iron in total amount thereof.

Furthermore, in the above cold accumulating material, it is also preferable that the magnetic particles are composed of oxide magnetic particles expressed by a general formula of $Gd_{1-x}R_xA_{1-y}B_yO_3$ wherein R denotes at least one of rare earth element selected from the group consisting of Ce, Pr, Nd, Pm, Sm, Tb, Dy, Ho and Er, while A denotes at least one element selected from the group consisting of Ti, V, Cr, Mn, Fe, Co, Ni, Cu, Zn, Ga, Ge, Al and Si, at least two elements being selected as A component in a case of x=0 and y=0, while at least one element being selected as A component in a case of x≠0 or y≠0, B denotes at least one element selected from the group consisting of Zr, Nb, Mo, Ag, In, Sn, Sb, Hf, Ta, W, Au, and Bi, and x in atomic ratio satisfies a relation: $0 \leq x \leq 0.4$, while y in atomic ratio satisfies a relation: $0 \leq x \leq 0.4$.

Furthermore, in the above cold accumulating material, it is also preferable that the magnetic particles are composed of oxide magnetic particles having at least one property selected from: a property exhibiting a specific heat of 0.3 J/K cm$^3$ or more in a temperature range of 4.0–5.0 K; a property exhibiting a specific heat of 0.35 J/K cm$^3$ or more in a temperature range of 4.5–5.5 K; and a property exhibiting a specific heat of 0.4 J/K cm$^3$ or more in a temperature range of 5.5–6.0 K.

A method of manufacturing the cold accumulating material of the present invention comprises the steps of: granulating oxide powder to form granulated particles; press-treating thus obtained granulated particles to prepare densified particles each having a spherical shape; and conducting a sintering treatment to the densified particles thereby to prepare a cold accumulating material composed of a number of magnetic particles.

In the above method in accordance with the granulation method, it is preferable that the press-treatment for the granulated particles is a cold isostatic pressing (CIP) treatment. It is also preferable that the sintering treatment for the densified particles is a hot isostatic pressing (CIP) treatment. Further, it is also preferable that the method further comprises the steps of: adding 5–30 wt % of binder to the oxide powder to form a mixed powder; and granulating the mixed powder to form the granulated particles.

Another method of manufacturing cold accumulating material of the present invention comprising the steps of: melting oxide powder by being passed through heat-plasma to form a molten liquid; and solidifying the molten liquid in a state where the molten liquid is spheroidized by the action of surface tension of the molten liquid thereby to prepare a cold accumulating material composed of a number of magnetic particles.

In the method of manufacturing cold accumulating material in accordance with heat plasma method, it is also preferable that the method further comprises the step of conducting a heat treatment at a temperature of 500° C. or more with respect to the magnetic particles spherically formed by being passed through the heat plasma. Further, it is also preferable that the temperature for the heat treatment is 1200–1700° C.

A cold accumulation refrigerator of the present invention comprises a regenerator filled with a cold accumulating material through which a cooling medium gas flows from a high temperature upstream side of the regenerator, so that heat is exchanged between the cooling medium gas and the cold accumulating material packed in the regenerator thereby to obtain a lower temperature at a downstream side of the regenerator, wherein at least part of the cold accumulating material packed in the regenerator is composed of the cold accumulating material of the present invention.

In addition, when the high temperature side of the regenerator is packed with a conventional non-oxide type cold accumulating material, while the low temperature side of the regenerator is packed with the cold accumulating material of the present invention, it becomes possible to suitably control a specific heat distribution in the regenerator. As the aforementioned non-oxide type cold accumulating material, the materials are not particularly limited. The conventional materials such as Pb, HoCu$_2$, Er$_3$Ni or the like can be used.

Each of the MRI (Magnetic Resonance Imaging) apparatus, super-conducting magnet for the magnetic floating train, cryopump and in-magnetic field single crystal pull-up apparatus (magnetic field applied Czochralski) according to the present invention is characterized by comprising the cold accumulation refrigerator as described above.

The cold accumulating material of the present invention consists of a number of magnetic particles mainly composed of oxide having a peak of specific heat at an extremely low temperature region below 20 k. As the oxide constituting the magnetic particles, for example, compositions expressed by the following general formulae (1), (2), (3) and (4) are suitably used.

That is, there can be used a perovskite-type oxide expressed by a general formula:

$$RMO_3 \qquad (1)$$

wherein R denotes at least one of rare earth element selected from the group consisting of Y, La, Ce, Pr, Nd, Pm, Sm, Eu, Gd, Tb, Dy, Ho, Er, Tm and Yb, while M denotes at least one element selected from 3 B family elements.

There can be also used a spinel-type oxide expressed by a general formula:

$$AB_2O_4 \qquad (2)$$

wherein A denotes at least one of rare earth element selected from 2 B family elements, while B denotes transition metal elements containing at least of Cr.

There can be also used an oxide expressed by a general formula:

$$CD_2O_6 \qquad (3)$$

wherein C denotes at least one element selected from Mn and Ni, while D denotes at least one element selected from Nb and Ta.

Among the above oxides, GdAlO$_3$ had been considered to be preferable, because this oxide had an extremely sharp and high specific heat peak at a low temperature region about 3.9 K. However, this oxide had a disadvantage of having a small specific heat at a high temperature side of 4 k or more. Therefore, in spite of having such a high peak of the specific heat, an improvement of the refrigerating capacity at 4.2 K was not sufficient.

Therefore, the present invention proposes a cold accumulating material having a composition expressed by the following general formula (4) as the cold accumulating material having a high specific heat peak at a high temperature side in comparison with that of the conventional cold accumulating material having a composition of GdAlO$_3$.

Namely, it is preferable to use a cold accumulating material composed of an oxide magnetic particles expressed by a general formula of:

$$Gd_{1-x}R_xA_{1-y}B_yO_3 \qquad (4)$$

wherein R denotes at least one of rare earth element selected from the group consisting of Ce, Pr, Nd, Pm, Sm, Tb, Dy, Ho and Er, while A denotes at least one element selected from the group consisting of Ti, V, Cr, Mn, Fe, Co, Ni, Cu, Zn, Ga, Ge, Al and Si, at least two elements being selected as A component in a case of x=0 and y=0, while at least one element being selected as A component in a case of x≠0 or y≠0, B denotes at least one element selected from the group consisting of Zr, Nb, Mo, Ag, In, Sn, Sb, Hf, Ta, W, Au, and Bi, and x in atomic ratio satisfies a relation: 0≦x≦0.4, while y in atomic ratio satisfies a relation: 0≦x≦0.4.

In the cold accumulating material of the present invention, it is preferable that the magnetic particles are composed of oxide magnetic particles having at least one property selected from: a property exhibiting a specific heat of 0.3 J/K cm$^3$ or more in a temperature range of 4.0–5.0 K; a property exhibiting a specific heat of 0.35 J/K cm$^3$ or more in a temperature range of 4.5–5.5 K; and a property exhibiting a specific heat of 0.4 J/K cm$^3$ or more in a temperature range of 5.5–6.0 K.

When the cold accumulating materials having various specific heat characteristics were packed in the refrigerator and refrigerating tests were conducted, the inventors of the present invention had obtained the following knowledge.

That is, in order to improve the refrigerating capacity at 4 K, it was confirmed that at least one of the aforementioned characteristics of the specific heat at the three temperature regions should be satisfied. Among the above three specific heat characteristics, it is preferable to satisfy two characteristics of the specific heat. Further, it is more preferable to satisfy all of the three characteristics of the specific heat.

Regarding the general formula (4) of $Gd_{1-x}R_xA_{1-y}B_yO_3$, in a case of x=0 and y=0, the general formula (4) can be expressed by a formula of $GdAO_3$. In this oxide composition of $GdAO_3$, however, when the A component is composed of a single element, there can be generally obtained a magnetic body having a specific heat at an extremely low temperature region, while the magnetic body rarely exhibits a high specific heat at the extremely low temperature range of 4–6 K. Therefore, in a case of x=0 and y=0, at least two elements are selected as A component. On the other hand, when a part of Gd is substituted for the other rare earth element, or when a part of A component is substituted for the other element, it becomes possible to control the specific heat characteristics of the magnetic body thereby to obtain a cold accumulating material having an excellent performance.

In the above general formula (4) of a general formula of $Gd_{1-x}R_xA_{1-y}B_yO_3$, R component denotes at least one of rare earth element selected from the group consisting of Ce, Pr, Nd, Pm, Sm, Tb, Dy, Ho and Er, and R is an effective component for broadening a sharpened specific heat peak and controlling the position of the peak temperature. The R component is added so as to substitute a part of Gd. When the addition ratio x indicating the substituting amount of R component exceeds 0.4, the specific heat of the magnetic body is disadvantageously lowered. Among the above R component, Tb, Dy, Ho and Er are preferable, and Tb and Dy are more preferable.

Further, A component denotes at least one element selected from the group consisting of Ti, V, Cr, Mn, Fe, Co, Ni, Cu, Zn, Ga, Ge, Al and Si, and has an effect of controlling the peak of specific heat. At least two elements are selected in a case of x=0 and y=0, while at least one element is selected in a case of x≠0 or y≠0, so that a part of Gd or A component in $GdAO_3$ type magnetic body is invariably substituted for the other element. Among the above a component elements, of Ti, V, Cr, Mn, Fe, Co, Ni, Ga and Al are preferable, and Cr, Mn, Fe, Co, Ni, Ga and Al are more preferable.

Furthermore, B component is an element for improving the specific heat characteristic by the function of controlling a distance between atoms of $(Gd_{1-x}R_x)$ when B component is substituted for a part of A component. The B component denotes at least one element selected from the group consisting of Zr, Nb, Mo, Ag, In, Sn, Sb, Hf, Ta, W, Au and Bi. As the B component element, Zr, Nb, Mo, Sn, Ta and W are preferable, and Ta and W are more preferable. When the addition ratio y indicating the addition amount of B component exceeds 0.4, it becomes impossible to maintain the perovskite structure, so that the specific heat characteristics of the cold accumulating material composed of the magnetic body is disadvantageously lowered.

Furthermore, there may be a case where the atomic ratio of oxygen in the above general formula: $Gd_{1-x}R_xA_{1-y}B_yO_3$ is deviated from a stoichiometric ratio of 3 due to atomic defectives or the like. However, if the atomic ratio of oxygen is within a range of 2.5–3.5, the above deviation has not a great influence on the specific heat characteristic of the magnetic body.

An average value of the equivalent circle diameters of the crystal grains of the magnetic particles constituting the cold accumulating material of the present invention is set to 0.3–20 μm. In this connection, as shown in FIG. 16, the equivalent circle diameter D of the crystal grain 2 is defined as a diameter D of a normal circle having a sectional area A which is equal to an exposed area or a sectional area of the crystal grain 2 of the magnetic particle when a surface structure or a sectional structure of the magnetic particle is observed. The average value is calculated by averaging the equivalent circle diameters of 100 crystal grains sampled arbitrarily.

By the way, since the cold accumulating material of the present invention is constituted by the magnetic particles mainly composed of an oxide, when the magnetic particle is lapped or polished in order to observe the sectional structure of the magnetic particle, grain boundary phases are collapsed by polishing agent, so that the boundaries of the crystal grains become unclear, whereby there may be a case where the measuring of the equivalent circle diameter of the crystal grain becomes difficult. Even in such a case, it is possible to measure the size of the crystal grain revealed and exposed on the surface structure of the magnetic particle.

When the average value of the equivalent circle diameters of the crystal grains of the magnetic particles is less than 0.3 μm, the crystal grain boundaries having a high heat resistance are disadvantageously increased thereby to deteriorate a thermal conductivity of the magnetic particles, thus being not preferable. On the other hand, when the average value of the equivalent circle diameters of the crystal grains exceeds 20 μm, a mechanical strength of the magnetic particle becomes insufficient. Accordingly, the average value of the equivalent circle diameters of the crystal grains is set to a range of 0.3–20 μm. However, a range of 0.5–10 μm is more preferable. Further, a range of 1–7 μm is more preferable.

In the cold accumulating material of the present invention, it is also preferable that an area ratio of the crystal grains each having an equivalent circle diameter of 50 μm or more is 10% or less with respect to whole number of crystal grains constituting the magnetic particle. In a case where the above area ratio exceeds 10%, a thermal shock caused by a rapid descent of temperature to be occurred at the time of starting the refrigerator is applied to the magnetic particles, so that cracks are formed to the magnetic particles whereby the particles are liable to be easily broken. These phenomena are assumed to cause due to the following reason. That is, it is considered that a rapid shrinkage of the crystal grain having a larger equivalent circle diameter exceeding 50 μm cannot be fully absorbed and relieved by the whole crystal structure of the magnetic particle whereby the cracks are liable to occur.

The more preferable range of the area ratio of the crystal grains each having the equivalent circle diameter of 50 μm or more is 5% or less. In addition, it is more preferable that the area ratio of the crystal grains each having the equivalent circle diameter of 40 μm or more is 10% or less. Further, it is more preferable that the area ratio of the crystal grains each having the equivalent circle diameter of 30 μm or more is 10% or less.

The size of the crystal grain can be adjusted by controlling various manufacturing conditions such as sintering temperature, sintering time, heating speed of the molded material body, cooling speed after the sintering operation, impurity content in the material molded body or the like. However, these manufacturing conditions are complicatedly affected to each other, and greatly influenced by factors inherent to a sintering furnace or the like, so that it is difficult to simply specify the manufacturing conditions.

However, in general, when the sintering temperature is set to high or the sintering time is prolonged, there is a tendency of increasing the size of the crystal grains. In the same manner, when both the heating speed at the sintering operation and the cooling speed after the sintering operation are lowered, there is a tendency of the crystal grains being grown to be coarsened. In addition, an impurity is one factor of generating nucleus of crystal, so that the size of the crystal grain is easily increased when the impurity content is small.

The measuring and evaluation of the crystal grain size can be performed through an image processing of a structural chart obtained by observing the surface structure or the sectional crystal structure of the magnetic particle by means of a scanning-type electron microscope (SEM).

In a case where the cold accumulating material of the present invention is constituted by the magnetic particles composed of sintered bodies of granulated grains, it is preferable that the sintering density (relative density) of the magnetic particles is set to a range of 86–99.8%. When the sintering density is less than 86%, the mechanical strength of the magnetic particle becomes insufficient and a packing amount of the magnetic particles into a regenerator is disadvantageously lowered, thus being not preferable. On the other hand, when the above sintering density exceeds 99.8%, the thermal shock caused by a rapid descent of temperature to be occurred at the time of starting the refrigerator is applied to the magnetic particles, so that the cracks are liable to occur, thus being not preferable. A more preferable range of the sintering density is set to a range of 95–99.8%. A more preferable sintering density is 98–99.8%. On the other hand, in a case where the cold accumulating material is constituted by the magnetic particles manufactured in accordance with a heat-plasma method, the density of the magnetic particles can attain to 99–100%.

It is preferable that the magnetic particles constituting the cold accumulating material contain at least one element selected from the group consisting of Y, Mg, Al, Ca and rare earth elements in a range of 0.5–15 wt % calculated as oxide thereof, and the selected elements are different from elements constituting the magnetic particles.

The oxide as a main phase constituting the magnetic particles has a peculiar peak of the specific heat at an extremely low temperature region below 40 K, and has a function as cold accumulating material. When at least one element selected from the group consisting of Y, Mg, Al, Ca and rare earth elements in a range of 0.5–15 wt % calculated as oxide thereof that are different from elements constituting the main phase are contained, the above oxide sintered body can be further densified. By densifying the respective magnetic particles, there can be realized the magnetic cold accumulating material composed of a composite oxide having a high mechanical strength and an excellent thermal shock resistance.

An adding component containing at least one element selected from the group consisting of Y, Mg, Al, Ca and rare earth elements that are different from the component constituting the main phase of the above magnetic particles is generally added in a form of oxide. However, the adding component is not limited to oxide, but can be also added as compounds such as carbide, nitride or the like. Among the above adding components, Y, Ce, Mg and Ca are particularly preferable for obtaining the densifying effect.

When the addition amount of the adding component is less than 0.5 wt % calculated as oxide thereof, the effect of densifying the sintered body is small. On the other hand, when the addition amount exceeds 15 wt %, a ratio of the main phase constituting the magnetic particle is relatively lowered thereby to deteriorate the cold accumulating effect. Therefore, the addition amount is set to 0.5–15 wt %, however, a preferable range of the addition amount calculated as oxide thereof is 1–10 wt %. A range of 2–7 wt % is more preferable.

Further, in the cold accumulating material of the present invention comprising a number of magnetic particles mainly composed of oxide, it is preferable that a ratio of the magnetic particles each of which surface is formed with at least two cracks each having a length of 10 $\mu$m or more is 20% or less with respect to whole number of the magnetic particles.

When there exists a plurality of cracks on a surface of the magnetic particles constituting the cold accumulating material, the cracks are liable to advance by vibration and impact force applied thereto at the time of operation of the refrigerator, so that a possibility of the particles being destroyed is disadvantageously increased. To put it more concretely, when an existing ratio (number ratio) of the magnetic particles each of which surface is formed with at least two cracks each having a length of 10 $\mu$m or more exceeds 20%, the ratio of the particles to be broken is increased. As a result, the generated fine powder will damage the seal portions of the refrigerator thereby to lower the performance of the refrigerator.

Therefore, the existing ratio of the magnetic particles each of which surface is formed with at least two cracks each having a length of 10 $\mu$m or more is set to 20% or less. However, a ratio of 10% or less is more preferable, and a ratio of 5% is furthermore preferable. In this connection, it is more preferable that the crack to be an object to be measured is a crack having a length of 5 $\mu$m or more. It is furthermore preferable that the crack to be an object to be measured is a crack having a length of 3 $\mu$m or more.

Further, it is preferable that the cold accumulating material comprises a number of magnetic particles mainly composed of oxide and a ratio of the magnetic particles, each of which surface roughness in terms of maximum height ($R_{max}$) is 10 $\mu$m or more, is 30% or less with respect to whole number of the magnetic particles.

In a case where the surface roughness of the magnetic particle is large, a stress concentration is liable to occur at portions formed with projections or irregularities, so that the particle is broken at the stress concentrated portion as a starting point of the breakage. To prevent such a phenomenon, the ratio of the magnetic particles each having a maximum height of ($R_{max}$) showing a degree of surface roughness is set to 30% or less. It is more preferable that the ratio of the magnetic particles each having a maxim height of 10 $\mu$m or more is set to 30% or less. It is more preferable that the ratio of the magnetic particles each having a maximum height of 10 $\mu$m or more is set to 20% or less. The ratio of 10% or less is furthermore preferable.

In this connection, it is more preferable that the maximum height of the surface roughness to be an object to be evaluated is a maximum height of 5 $\mu$m or more. Furthermore, the maximum height of 3 $\mu$m or more is furthermore preferable to be adopted as the object to be evaluated. The aforementioned surface roughness can be measured in accordance with Japanese Industrial Standard (JIS-B0601) in which the surface structure is photographed by means of an observing means such as a scanning-type electron microscope (SEM) or the like, then the surface roughness can be obtained from a cross-sectional curve of thus obtained photographic image.

Further, in the cold accumulating material of the present invention comprising a number of magnetic particles mainly composed of oxide, it is preferable that a ratio of the magnetic particles in which void or pore having a maximum width of 20 µm or more exist is 40% or less with respect to whole number of the magnetic particles.

In this connection, the maximum width of the pore or void is measured as a shorter-side length of a quadrangle having a minimum area after enclosing a sectional shape of the pore or void exposed on a cross-sectional area of the magnetic particle.

In also a case where the pores or voids are formed within the magnetic particles, the mechanical strength of the magnetic particles is lowered, so that the magnetic particles are liable to be broken during the operation of the refrigerator.

Therefore, the ratio of the magnetic particles in which void or pore having a maximum width of 20 µm or more exist is set to 40% or less. However, a ratio of 30% or less is more preferable, and a ratio of 20% is furthermore preferable. In this connection, it is more preferable that the width of the pore or void to be an object to be measured is a pore or void having a width of 5 µm or more. The width of 3 µm or more is furthermore preferable.

The method of measuring the ratio of the magnetic particles having defects such as aforementioned cracks, the maximum height of surface roughness, pore or void or the like is not particularly limited. However, for example, the ratio can be measured in accordance with the following method. That is, there can be adopted a method in which 20 or more of the magnetic particles are sampled at random from the cold accumulating material composed of a number of magnetic particles, then defective circumstances of cracks, maximum height, pore or void or the like are observed through the observing means such as electron microscope or the like, thereafter, the ratio of the magnetic particles having a defect is calculated. In this case, in order to measure the ratio of the particles having the defect with high accuracy, it is preferable that the number of the particles to be an object for the observation is set to 50 or more. Further, 100 or more of the particles are furthermore preferable.

In this regard, in case of the observation of the cracks, it is sufficient to observe only one side surface of the respective particles. Namely, when a group of the particles is observed at one visual field, it is not required to consider opposite side surfaces each forming a shadow of the respective particles. On the other hand, in case of measuring the surface roughness and the internal defects of the magnetic particles, the objective particles are buried in a base material such as resin or the like. Thereafter, a surface of the base material is lapped or polished so as to expose a cross-sectional area of the particle, then the cross-sectional area is observed by a microscope, thus being a suitable method of measuring the defectives. In this case, a cross-sectional area of a particle having a diameter corresponding to 80–120% of the average diameter of the magnetic particles shall be selected as an object for the measurements.

Further, in the cold accumulating material of the present invention comprising a number of magnetic particles mainly composed of oxide, it is also preferable that the magnetic particles contain 3 ppm-2 mass % of silicon, sodium and iron in total amount thereof.

The inventors of the present invention had paid attention to a fact that a precipitated substance (deposit) precipitated in the grain boundaries at a small amount has a great influence on the strength of the sintered body. As a result of the continuous researches, the inventors of this invention had obtained a knowledge of that the strength of the sintered body is disadvantageously lowered when a large amount of compounds such as oxides or the like of silicon (Si), sodium (Na) and iron (Fe) are precipitated in the grain boundaries.

That is, the inventors had obtained a finding of that when a total amount of the Si, Na and Fe exceeds 2 mass %, the strength as the cold accumulating material is disadvantageously lowered.

On the other hand, when the total amount of the Si, Na and Fe is less than 3 ppm, the amount of the precipitated substance for suppressing the crystal growth is extremely lowered thereby to coarsen the crystal grains. When the crystal grains are grown and coarsened, the mechanical strength of the magnetic particles is disadvantageously lowered, and the thermal shock resisting property is also deteriorated.

Accordingly, it is preferable that the total amount of silicon, sodium and iron is set to 3 ppm-2 mass %. However, an amount of 10 ppm-1 mass % is more preferable, and an amount of 50–5000 ppm is furthermore preferable. In this connection, in the aforementioned general formula (4), when at least one element of Si and Fe is selected as A component, the aforementioned total amount means an amount excluding the amount contained as A component in general formula (4).

The method of manufacturing the cold accumulating material of the present invention is not particularly limited. However, for example, the cold accumulating material can be manufactured in accordance with a method comprising the steps of: mixing a material powder by means of a ball mill or the like to prepare a material mixture; spherically molding (granulating) thus obtained material mixture through rolling-granulation method, agitating granulation method, extrusion method, atomizing method (spraying method) or press-molding method or the like; and sintering thus obtained spherical molded (granulated) body.

The material powder to be used in the above manufacturing method shall preferably be a powder having a grain size of 0.3–30 µm. A more preferable range of the grain size is 0.4–10 µm. Further, a range of 0.5–8 µm is furthermore preferable.

By the way, there may be a case where the molded particles or granulated particles manufactured through rolling-granulation method, agitating granulation method, extrusion method, atomizing method (spraying method) or press-molding method or the like has a low molding-density, so that there is a case where the molded (granulated) particles cannot be sintered particles having a good property even after a sufficient sintering operation.

Therefore, the present invention also adopts the following manufacturing method.

Namely, there can be adopted a method of manufacturing the cold accumulating material comprising the steps of: granulating oxide powder to form granulated particles; press-treating thus obtained granulated particles through a cold-isostatic pressing method to prepare densified particles each having a spherical shape; and conducting a sintering treatment to the densified particles thereby to prepare a cold accumulating material composed of a number of magnetic particles.

In the aforementioned manufacturing method, a hot isostatic pressing (HIP) treatment may be conducted as the press-treatment. By conducting the hot isostatic pressing (HIP) treatment or the cold isostatic pressing (CIP) treatment to the granulated particles, the density of the molded body can be further improved. Furthermore, when the molded body having such a high density is sintered, the magnetic particle having less cracks and pores or voids can be effectively obtained.

Further, in the aforementioned manufacturing method, when the method further comprises the steps of adding 5–30 wt % of binder to the oxide powder; and granulating the oxide powder, the molding density of the granulated particles can be further increased.

As the example of the binder, water, ethyl alcohol, carboxyl methyl cellulose, hydroxy propyl cellulose, polyvinyl alcohol, polyvinyl butyral, polyethylene glycol, poly acrylic acid ester or the like can be suitably used.

When the addition amount of the binder to the oxide material powder is excessively small to be less than 5 wt %, the effect of increasing the density by bonding the powders to each other with a high strength becomes insufficient. On the other hand, when the addition amount is excessively large so as to exceed 30 wt %, the ratio of the oxide powder in the molded body is excessively lowered thereby to decrease the molding density. Therefore, the addition amount of the binder is specified to a range of 5–30 wt %.

The added binder is removed by conducting a degreasing treatment to the granulated body or the molded body. Then, the degreased molded body or the like is sintered thereby to prepare the cold accumulating material of the present invention.

Other than the aforementioned method comprising the steps of spherically granulating the material powder through the rolling granulation method to form the granulated particles; and sintering the granulated particles, there can be also adopted the following method in which the material powder is spheroidized by utilizing a heat plasma.

That is, there can be also adopted a method of manufacturing cold accumulating material comprising the steps of: granulating the oxide particles having a predetermined composition; melting the granulated oxide particles by being passed through heat-plasma to form a molten liquid; and solidifying the molten liquid in a state where the molten liquid is spheroidized by the action of surface tension of the molten liquid thereby to prepare a cold accumulating material composed of a number of magnetic particles.

The method of granulating the aforementioned oxide particles is not particularly limited. For example, various granulating methods such as rolling-type, extruding-type, atomizing-type (spraying-type) can be used. As the material powder, a powder having an average grain size of 0.3–30 $\mu$m is suitable. The more preferable average grain size of the material powder is 0.5–20 $\mu$m. Further, a range 1–10 $\mu$m is furthermore preferable.

In this regard, "heat plasma" means a state of a gas being discharged at a high temperature. The heat plasma can be generated by the discharge of the gas by the action of direct current or high frequency electromagnetic wave having a frequency of several MHz to several GHz.

FIG. 3 shows a structure of a heat plasma apparatus. This heat plasma apparatus 80 comprises: a reaction vessel 81; a high-frequency oscillator 82; a coil 83; an outer cylinder for enclosing a plasma generating portion 86; a powder supplying port 86 which is opened so as to oppose to a plasma flame 85 generated at a top portion of the reaction vessel 81; a carrier gas supplying bomb 88 for carrying a powder stored in a powder supplying container 87 to the reaction vessel 81; a gas source 89 for generating the plasma; a cyclone 90 for separating the generated particles; and a cooling-gas source 91 for cooling the reaction vessel 81.

In the above heat plasma apparatus 80, the electromagnetic wave oscillated from the high-frequency oscillator 82 is amplified by the coil 83, while the gas supplied from the gas source 89 causes a discharge, so that a plasma flame 85 having a high temperature is generated at the top portion of the reaction vessel 81. The gas temperature of the flame portion 85 attains to several thousands ° C. to about 10,000° C.

When the oxide particles together with the carrier gas supplied from the powder-supplying container 87 are thrown into the plasma flame 85 being under a state of high temperature, an entire particle or a part of the particle including a surface portion thereof is molten. The molten material powder is spheroidized by the action of the surface tension thereof. Then, the molten material is rapidly cooled and solidified by the cooling gas supplied from the cooling gas source 91 to form magnetic particles. Thus spherically formed magnetic particles are separated by the cyclone 90 and then recovered. As mentioned above, at least part of the material is molten, and then rapidly cooled and solidified in a spheroidized state, so that there can be obtained the magnetic particles having no crack on the surfaces thereof, a smooth surface resulting in a small surface roughness, and having no pore or void within the particles.

However, the magnetic particles spheroidized through the heat plasma method are manufactured by rapidly cooling the molten material in a state of high temperature of several thousands ° C., a particle texture or crystal structures such as perovskite structure capable of exhibiting a good specific heat characteristic cannot be obtained under some material compositions or treating conditions or the like, so that there is a case where a complicated structure including amorphous phase and crystal phase different from the aimed phase are disadvantageously formed. Accordingly, an inherent specific heat characteristic for the magnetic particles cannot be obtained, so that there has been posed a problem of lowering the refrigerating capacity of a refrigerator.

To cope with the above problem, as one effective embodiment of the method of manufacturing the cold accumulating material according to the present invention, it is preferable that the method further comprises the step of conducting a heat treatment at a temperature of 500° C. or more with respect to the magnetic particles spherically formed by being passed through the heat plasma.

When the magnetic particles having crystal phases different from the aimed phase or having non-equilibrium phases such as amorphous phase or the like generated by being rapidly cooled from a state of high temperature in the heat plasma is subjected to the heat treatment at a temperature of 500° C. or more, it becomes possible to re-synthesize the crystal phases different from the aimed phase and the non-equilibrium phases into the aimed crystal phases such as perovskite phase or the like.

When the temperature of the aforementioned heat treatment is less than of 500° C., the effect of the re-synthesis of the crystal phases is not sufficient. In this regard, although a high temperature is preferable for the heat treatment, when the temperature exceeds a temperature 50° C. lower than a melting point of the magnetic particles, a part of the magnetic particles starts to melt, thus being not preferable.

In view of the treating time and the limited specification of the heat-treating furnace, the temperature for the heat treatment is preferably set to 1800° C. or less. Further, the more preferable temperature range for the heat treatment is 1000–1750° C., and the best temperature range for the heat treatment is 1200–1700° C. Although a time for the heat treatment is not particularly limited, the time is set to a range of 10 minutes to 50 hours. In addition, air or oxygen is preferable as an atmosphere for the heat treatment.

The cold accumulation type refrigerator of the present invention is constituted by being assembled with a regenerator (cold accumulating unit) into which the aforementioned cold accumulating material is packed as at least part of a cold accumulating material. The refrigerator of the present invention can be also constructed in such a manner that the cold accumulating material of this invention is packed into a regenerator for a predetermined cooling stage of the refrigerator while other cold accumulating materials such as Pb, $HoCu_2$, and $Er_3Ni$ or the like having a specific heat characteristics corresponding to a required temperature distribution are packed into the same or another regenerator in a combined manner.

According to the cold accumulating material constructed as above, the equivalent circle diameter of the crystal grain, density, amount of additives (composition), amount of impurities, amount of defects such as crack and pore or void or the like are specified to a predetermined range, so that there can be provided the cold accumulating material having a high mechanical strength, a high thermal conductivity and an excellence in a thermal shock resistance, and having no fear of being finely pulverized.

Therefore, even if the cold accumulating material is used as a cold accumulating material for the refrigerators such as Starling refrigerator and a pulse-tube type refrigerator to be operated with a high speed, a pressure loss at the regenerator is small and there can be provided a cold accumulating material capable of exhibiting a stable refrigerating performance for a long time of period.

Further, when the above cold accumulating material is used as at least part of a cold accumulating material for the refrigerator, there can be provided a refrigerator having a high refrigerating performance at low temperature range, and capable of maintaining a stable refrigerating performance for a long time.

Furthermore, in an MRI apparatus, a cryopump, a super-conducting magnet for magnetic floating train, and a in-magnetic field single crystal pull-up apparatus (magnetic field applied Czochralski), since, in all of them, performance of the refrigerator dominates the performance of each apparatus, an MRI apparatus, a cryopump, a super-conducting magnet for magnetic floating train, and an in-magnetic field single crystal pull-up apparatus in which the above described refrigerators are assembled therein can exhibit excellent performances for a long term.

DESCRIPTION OF THE PREFERRED EMBODIMENTS

Next, the preferred embodiments of the present invention will be described with reference to the accompanying drawings.

EXAMPLE 1

$Al_2O_3$ powder and $Gd_2O_3$ powder each having an average grain size of 1.5 μm were mixed and pulverized in ethyl alcohol by means of a ball mill for 24 hours thereby to prepare a material mixture. After the material mixture was dried, the material mixture was then calcinated at a temperature of 1500° C. for 12 hours thereby to synthesize $GdAlO_3$ as an oxide sintered body.

Next, thus obtained calcinated body was pulverized in ethyl alcohol by means of a ball mill for 6 hours. The pulverized powder was dried, and then granulated by means of a rolling granulation machine thereby to prepare granulated particles having a particle size of 0.1–0.4 mm. Thereafter, the obtained granulated particles were sintered at a temperature of 1700° C. for 12 hours thereby to manufacture a cold accumulating material of Example 1 composed of magnetic particles each having an almost spherical shape.

A surface structure and a cross-sectional structure of thus obtained cold accumulating material particles were observed by means of a scanning-type electron microscope (SEM) thereby to obtain photographic images of the structures as shown in FIGS. 4 to 7. On the basis of these photographic images of the structures, an image analysis was conducted. As a result, an average value of the equivalent circle diameters of the crystal grains was 3.3 μm.

In the cold accumulating material particles manufactured in accordance with the rolling granulation method, as shown in FIGS. 4 to 7, the cold accumulating material had an almost spherical shape, a roughness of surface portion was large, and although a size was small, a number of pores were formed within the cold accumulating material particles.

Figure 1:
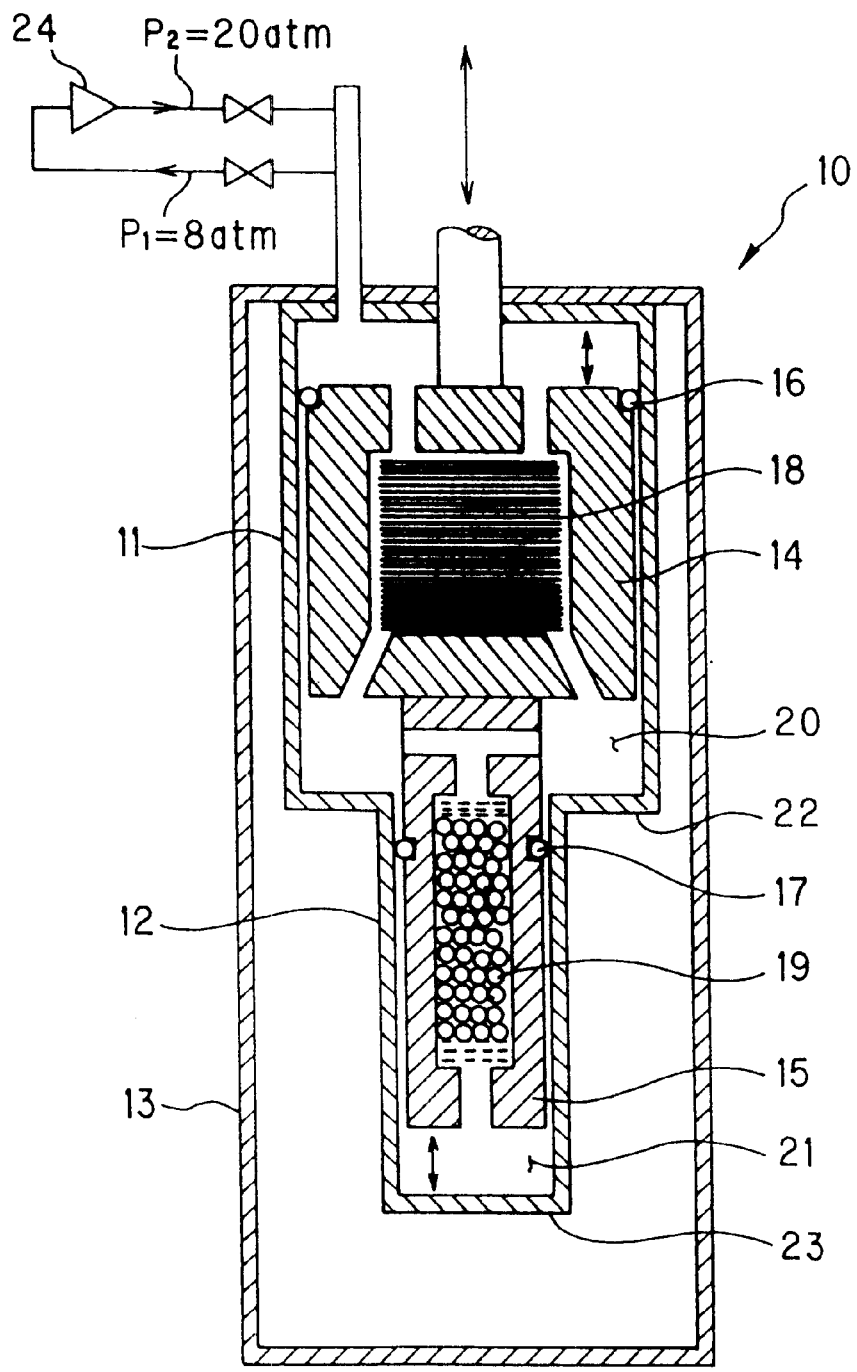
FIG. 1 is a cross sectional view showing an essential portion of a cold accumulation refrigerator (GM refrigerator) according to the present invention.

In order to evaluate the characteristics of the cold accumulating material as prepared above, there was prepared a two-staged expansion type GM refrigerator as shown in FIG. 1. In this regard, the two-staged expansion type GM refrigerator 10 shown in FIG. 1 is one embodiment of a refrigerator of the present invention.

The two-staged expansion type GM refrigerator 10 shown in FIG. 1 has a vacuum container 13 containing a first cylinder 11 having a large diameter and a second cylinder 12 having a small diameter, which is connected coaxially to the first cylinder 11. The first cylinder 11 contains a first regenerator (cold accumulating unit) 14 which is freely reciprocatable and the second cylinder 12 also contains a second regenerator (cold accumulating unit) 15 which is freely reciprocatable. Seal rings 16, 17 are disposed between the first cylinder 11 and first regenerator (cold accumulating unit) 14, and between the second cylinder 12 and second regenerator (cold accumulating unit) 15, respectively.

The first regenerator (cold accumulating unit) 14 accommodates a first cold accumulating material 18 made of Cu mesh or the like. The low temperature side of the second regenerator (cold accumulating unit) 15 contains a second cold accumulating material 19 for extremely low temperature cold used in a regenerator (cold accumulating unit) of this invention. The first regenerator (cold accumulating unit) 14 and second regenerator 15 have operating medium (cooling medium gas or refrigerant) passages for He gas or the like which are provided in gaps of the first cold accumulating material 18 and cold accumulating material 19 for extremely low temperature.

A first expansion chamber 20 is provided between the first regenerator (cold accumulating unit) 14 and second regenerator (cold accumulating unit) 15. A second expansion chamber 21 is provided between the second regenerator 15 and an end wall of the second cylinder 12. A first cooling stage 22 is provided on a bottom of the first expansion chamber 20 and further a second cooling stage 23 which is colder than the first cooling stage 22 is provided on a bottom of the second expansion chamber 21.

A highly pressurized operating medium (cooling medium gas e.g., He gas) is supplied from a compressor 24 to the aforementioned two-staged GM refrigerator 10. The supplied operating medium passes through the first cold accumulating material 18 accommodated in the first regenerator 14 and reaches the first expansion chamber 20, and further passes through the cold accumulating material for extremely low temperature (second cold accumulating material) 19 accommodated in the second regenerator 15 and reaches the second expansion chamber 21. At this time, the operating medium supplies heat energy to the respective first cold accumulating materials 18, 19, so that the materials are cooled.

The operating medium passing through the respective cold accumulating materials 18, 19 is expanded in the respective expansion chambers 20, 21 so as to produce cool atmosphere thereby cooling the respective cooling stages 22, 23. The expanded operating medium flows in the respective cold accumulating materials 18, 19 in opposite direction. The operating medium receives heat energy from the respective cold accumulating materials 18, 19 and is discharged. As recuperation effect is improved in this process, the refrigerator is constructed so that the heat efficiency of the operating medium cycle is improved whereby a further lower temperature is realized.

Then, thus prepared 200 g of the cold accumulating material of Example 1 was packed in a low-temperature side of the second regenerator of the two-staged expansion type GM refrigerator 10 shown in FIG. 1. In addition, 200 g of Pb cold accumulating material was packed in a high-temperature side of the second regenerator thereby to assemble a refrigerator according to Example 1, and a refrigeration test was carried out.

Note, the refrigerating capacity in the respective Examples is defined as a heat load at a time when a heat load supplied from a heater is applied to the second cooling stage during the operation of the refrigerator and a temperature rise in the second cooling stage is stopped at 4.2 K.

As a result of the refrigeration test, when a refrigerating capacity of the refrigerator at temperature of 4.2 K was measured, an initial refrigerating capacity of 0.76 W was obtained. Further, the refrigerating capacity after the refrigerator was continuously operated for 240 hours was 0.74 W, so that a stable refrigerating performance was able to confirm. In addition, after the completion of the refrigerating test, when the cold accumulating material packed in the regenerator (cold accumulating unit) of the refrigerator was took out from the unit and an appearance of the material was observed, any damage was not found at all to the cold accumulating material.

COMPARATIVE EXAMPLE 1

$Al_2O_3$ powder and $Gd_2O_3$ powder each having an average grain size of 30 μm were mixed and pulverized in ethyl alcohol by means of a ball mill for 24 hours thereby to prepare a material mixture. After the material mixture was dried, the material mixture was then calcinated at a temperature of 1500° C. for 12 hours thereby to synthesize $GdAlO_3$ as an oxide sintered body.

Next, thus obtained calcinated body was pulverized in ethyl alcohol by means of a ball mill for 6 hours. The pulverized powder was dried, and then granulated by means of a rolling granulation machine thereby to prepare granulated particles having a particle size of 0.1–0.4 mm. Thereafter, the obtained granulated particles were sintered at a temperature of 1800° C. for 12 hours thereby to manufacture a cold accumulating material of Comparative Example 1 composed of magnetic particles each having an almost spherical shape.

A cross-sectional structure of thus obtained cold accumulating material particles was observed by means of a scanning-type electron microscope (SEM) thereby to obtain photographic image of the structure. On the basis of this photographic image of the structure, an image analysis was conducted. As a result, an average value of the equivalent circle diameters of the crystal grains was coarse to be 28 μm.

Then, thus prepared 200 g of the cold accumulating material of Comparative Example 1 was packed in a low-temperature side of the second regenerator of the two-staged expansion type GM refrigerator 10 shown in FIG. 1. In addition, 200 g of Pb cold accumulating material was packed in a high-temperature side of the second regenerator thereby to assemble a refrigerator according to Comparative Example 1, and a refrigeration test was carried out thereby to measure a refrigerating capacity at 4.2 K.

As a result of the refrigeration test, when a refrigerating capacity of the refrigerator at temperature of 4.2 K was measured, an initial refrigerating capacity of 0.74 W was obtained. Further, the refrigerating capacity after the refrigerator was continuously operated for 240 hours was lowered to be 0.31 W, so that a lowering of the refrigerating performance was remarkable. In addition, after the completion of the refrigerating test, when the cold accumulating material packed in the regenerator (cold accumulating unit) of the refrigerator was took out from the unit and an appearance of the material was observed, particles broken into pieces and a generation of finely pulverized powder were observed to the cold accumulating material.

COMPARATIVE EXAMPLE 2

$Al_2O_3$ powder and $Gd_2O_3$ powder each having an average grain size of 1 μm were mixed and pulverized in ethyl alcohol by means of a ball mill for 24 hours thereby to prepare a material mixture. After the material mixture was dried, the material mixture was then calcinated at a temperature of 1200° C. for 6 hours thereby to synthesize $GdAlO_3$ as an oxide sintered body.

Next, thus obtained calcinated body was pulverized in ethyl alcohol by means of a ball mill for 6 hours. The pulverized powder was dried, and then granulated by means of a rolling granulation machine thereby to prepare granulated particles having a particle size of 0.1–0.4 mm. Thereafter, the obtained granulated particles were sintered at a temperature of 1700° C. for 3 hours thereby to manufacture a cold accumulating material of Comparative Example 2 composed of magnetic particles each having an almost spherical shape.

A cross-sectional structure of thus obtained cold accumulating material particles was observed by means of a scanning-type electron microscope (SEM) thereby to obtain photographic image of the structure. On the basis of this photographic image of the structure, an image analysis was conducted. As a result, an average value of the equivalent circle diameters of the crystal grains was excessively fine to be 0.2 μm.

Then, thus prepared 200 g of the cold accumulating material of Comparative Example 2 was packed in a low-temperature side of the second regenerator of the two-staged expansion type GM refrigerator 10 shown in FIG. 1. In addition, 200 g of Pb cold accumulating material was packed in a high-temperature side of the second regenerator thereby to assemble a refrigerator according to Comparative Example 2, and a refrigeration test was carried out thereby to measure a refrigerating capacity at 4.2 K.

As a result of the refrigeration test, when a refrigerating capacity of the refrigerator at temperature of 4.2 K was measured, an initial refrigerating capacity of 0.42 W was obtained. Further, a refrigerating capacity after the refrigerator was continuously operated for 240 hours was 0.41 W.

Next, an embodiment in which an area ratio of coarse crystal grains is restricted will be explained hereunder.

EXAMPLE 2

$Al_2O_3$ powder and $Gd_2O_3$ powder each having an average grain size of 1.5 μm were mixed and pulverized in ethyl alcohol by means of a ball mill for 24 hours thereby to prepare a material mixture. After the material mixture was dried, the material mixture was then calcinated at a temperature of 1600° C. for 3 hours thereby to synthesize $GdAlO_3$ as an oxide sintered body.

Next, thus obtained calcinated body was pulverized in ethyl alcohol by means of a ball mill for 6 hours. The pulverized powder was dried, and then granulated by means of a rolling granulation machine thereby to prepare granulated particles having a particle size of 0.1–0.4 mm. Thereafter, the obtained granulated particles were sintered at a temperature of 1700° C. for 12 hours thereby to manufacture a cold accumulating material of Example 2 composed of magnetic particles each having an almost spherical shape.

A cross-sectional structure of thus obtained cold accumulating material particle was observed by means of a scanning-type electron microscope (SEM) thereby to obtain photographic image of the structure. On the basis of this photographic image of the structure, an image analysis was conducted. As a result, a crystal grain having an equivalent circle diameter of 50 μm or more was not observed. Further, an equivalent circle diameter of a most coarse crystal grain was 21 μm. In addition, an average value of the equivalent circle diameters of the crystal grains was 3.8 μm.

Then, thus prepared 200 g of the cold accumulating material of Example 2 was packed in a low-temperature side of the second regenerator of the two-staged expansion type GM refrigerator 10 shown in FIG. 1. In addition, 200 g of Pb cold accumulating material was packed in a high-temperature side of the second regenerator thereby to assemble a refrigerator according to Example 2, and a refrigeration test was carried out thereby to measure a refrigerating capacity at a temperature of 4.2 K.

As a result of the refrigeration test, an initial refrigerating capacity of 0.70 W was obtained at a temperature of 4.2 K. Further, the refrigerating capacity after the refrigerator was continuously operated for 240 hours was 0.69 W, so that a stable refrigerating performance could be confirmed. In addition, after the completion of the refrigerating test, when the cold accumulating material packed in the regenerator (cold accumulating unit) of the refrigerator was took out from the regenerator and an appearance of the material was observed, any damage was not found at all to the cold accumulating material. Therefore, according to the cold accumulating material of this Example, it becomes possible to realize a refrigerator having a high refrigerating capacity at a temperature region of about 4 K, and capable of exhibiting stable characteristics.

COMPARATIVE EXAMPLE 3

$Al_2O_3$ powder and $Gd_2O_3$ powder each having an average grain size of 20 μm were mixed and pulverized in ethyl alcohol by means of a ball mill for 6 hours thereby to prepare a material mixture. After the material mixture was dried, the material mixture was then calcinated at a temperature of 1500° C. for 12 hours thereby to synthesize $GdAlO_3$ as an oxide sintered body.

Next, thus obtained calcinated body was pulverized in ethyl alcohol by means of a ball mill for 6 hours. The pulverized powder was dried, and then granulated by means of a rolling granulation machine thereby to prepare granulated particles having a particle size of 0.1–0.4 mm. Thereafter, the obtained granulated particles were sintered at a temperature of 1800° C. for 24 hours thereby to manufacture a cold accumulating material of Comparative Example 3 composed of magnetic particles each having an almost spherical shape.

A cross-sectional structure of thus obtained cold accumulating material particles was observed by means of a scanning-type electron microscope (SEM) thereby to obtain photographic image of the structure. On the basis of this photographic image of the structure, an image analysis was conducted. As a result, an area ratio of crystal grains each having an equivalent circle diameter of 50 μm or more was excessively large to be 17%. In addition, an average value of the equivalent circle diameters of the crystal grains was 24 μm.

Then, thus prepared 200 g of the cold accumulating material of Comparative Example 3 was packed in a low-temperature side of the second regenerator of the two-staged expansion type GM refrigerator 10 shown in FIG. 1. In addition, 200 g of Pb cold accumulating material was packed in a high-temperature side of the second regenerator thereby to assemble a refrigerator according to Comparative Example 3, and a refrigeration test was carried out thereby to measure a refrigerating capacity at 4.2 K.

As a result of the refrigeration test, an initial refrigerating capacity of 0.75 W was obtained at temperature of 4.2 K. Further, the refrigerating capacity after the refrigerator was continuously operated for 240 hours was lowered to be 0.28 W, so that the refrigerating performance was confirmed to be remarkably lowered. In addition, after the completion of the refrigerating test, when the cold accumulating material packed in the regenerator (cold accumulating unit) of the refrigerator was took out from the regenerator and an appearance of the material was observed, particles broken into pieces and a generation of finely pulverized powder were observed to the cold accumulating material.

Next, embodiments in which a sintering density of the magnetic particle is restricted will be explained hereunder.

EXAMPLE 3

$Al_2O_3$ powder and $Gd_2O_3$ powder each having an average grain size of 2 μm were mixed and pulverized in ethyl alcohol by means of a ball mill for 24 hours thereby to prepare a material mixture. After the material mixture was dried, the material mixture was then calcinated at a temperature of 1400° C. for 6 hours thereby to synthesize $GdAlO_3$ as an oxide sintered body.

Next, thus obtained calcinated body was pulverized in ethyl alcohol by means of a ball mill for 6 hours. The pulverized powder was dried, and then granulated by means of a rolling granulation machine thereby to prepare granulated particles having a particle size of 0.1–0.4 mm. Thereafter, the granulated particles were inserted into a bag made of nylon-polyethylene film. After, a gas content in the bag was evacuated, an opening portion of the bag was heat-sealed. In this state, an entire bag was subjected to a CIP treatment at a pressure of 600 Kg/cm$^2$ so as to increase a density of the particles. Then, the obtained granulated particles densified by the CIP treatment were sintered at a temperature of 1700° C. for 12 hours thereby to manufacture a cold accumulating material of Example 3 composed of magnetic particles each having an almost spherical shape.

When a sintering density of the cold accumulating material particle was measured, an average sintering density was 96.8%. In addition, an average value of the equivalent circle diameters of the crystal grains was 5.2 μm.

Then, thus prepared 200 g of the cold accumulating material of Example 3 was packed in a low-temperature side of the second regenerator of the two-staged expansion type GM refrigerator 10 shown in FIG. 1. In addition, 200 g of Pb cold accumulating material was packed in a high-temperature side of the second regenerator thereby to assemble a refrigerator according to Example 3, and a refrigeration test was carried out thereby to measure a refrigerating capacity at a temperature of 4.2 K.

As a result of the refrigeration test, an initial refrigerating capacity of 0.77 W was obtained at a temperature of 4.2 K. Further, the refrigerating capacity after the refrigerator was continuously operated for 240 hours was 0.75 W, so that a stable refrigerating performance could be confirmed. In addition, after the completion of the refrigerating test, when the cold accumulating material packed in the regenerator (cold accumulating unit) of the refrigerator was took out from the regenerator and an appearance of the material was observed, any damage was not found at all to the cold accumulating material.

EXAMPLE 4

$Al_2O_3$ powder and $Gd_2O_3$ powder each having an average grain size of 3 μm were mixed and pulverized in ethyl alcohol by means of a ball mill for 24 hours thereby to prepare a material mixture. After the material mixture was dried, the material mixture was then calcinated at a temperature of 1500° C. for 3 hours thereby to synthesize $GdAlO_3$ as an oxide sintered body.

Next, thus obtained calcinated body was pulverized in ethyl alcohol by means of a ball mill for 6 hours. The pulverized powder was dried, and then mixed with 10 wt % of carboxyl methyl cellulose. Subsequently, the resultant mixture was granulated by means of a rolling granulation machine thereby to prepare granulated particles having a particle size of 0.1–0.4 mm. Thereafter, the granulated particles were degreased and then sintered at a temperature of 1700° C. for 4 hours thereby to manufacture a cold accumulating material of Example 4 composed of magnetic particles each having an almost spherical shape.

When a sintering density of the cold accumulating material particle was measured, an average sintering density was 97.8%. In addition, an average value of the equivalent circle diameters of the crystal grains was 3.6 μm.

Then, thus prepared 200 g of the cold accumulating material of Example 4 was packed in a low-temperature side of the second regenerator of the two-staged expansion type GM refrigerator 10 shown in FIG. 1. In addition, 200 g of Pb cold accumulating material was packed in a high-temperature side of the second regenerator thereby to assemble a refrigerator according to Example 4, and a refrigeration test was carried out thereby to measure a refrigerating capacity at a temperature of 4.2 K.

As a result of the refrigeration test, an initial refrigerating capacity of 0.74 W was obtained at a temperature of 4.2 K. Further, the refrigerating capacity after the refrigerator was continuously operated for 240 hours was 0.74 W, so that a stable refrigerating performance could be confirmed. In addition, after the completion of the refrigerating test, when the cold accumulating material packed in the regenerator (cold accumulating unit) of the refrigerator was took out from the regenerator and an appearance of the material was observed, any damage was not found at all to the cold accumulating material. Therefore, according to the cold accumulating material of this Example, it becomes possible to realize a refrigerator having a high refrigerating capacity at a temperature region of about 4 K, and capable of exhibiting stable characteristics.

COMPARATIVE EXAMPLE 4

$Al_2O_3$ powder and $Gd_2O_3$ powder each having an average grain size of 50 μm were mixed and pulverized in ethyl alcohol by means of a ball mill for 2 hours thereby to prepare a material mixture. After the material mixture was dried, the material mixture was then calcinated at a temperature of 1200° C. for 2 hours thereby to synthesize $GdAlO_3$ as an oxide sintered body.

Next, thus obtained calcinated body was pulverized in ethyl alcohol by means of a ball mill for 6 hours. The pulverized powder was dried, and then granulated by means of a rolling granulation machine thereby to prepare granulated particles having a particle size of 0.1–0.4 mm. Thereafter, the obtained granulated particles were sintered at a temperature of 1400° C. for 3 hours thereby to manufacture a cold accumulating material of Comparative Example 4 composed of magnetic particles each having an almost spherical shape.

When a sintering density of the cold accumulating material particle was measured, an average sintering density was excessively small to be 73.6%. In addition, an average value of the equivalent circle diameters of the crystal grains was 51 μm.

Then, thus prepared 200 g of the cold accumulating material of Comparative Example 4 was packed in a low-temperature side of the second regenerator of the two-staged expansion type GM refrigerator 10 shown in FIG. 1. In addition, 200 g of Pb cold accumulating material was packed in a high-temperature side of the second regenerator thereby to assemble a refrigerator according to Comparative Example 4, and a refrigeration test was carried out thereby to measure a refrigerating capacity at 4.2 K.

As a result of the refrigeration test, an initial refrigerating capacity of 0.62 W was obtained at temperature of 4.2 K. Further, the refrigerating capacity after the refrigerator was continuously operated for 240 hours was lowered to be 0.24 W, so that the refrigerating performance was confirmed to be remarkably lowered. In addition, after the completion of the refrigerating test, when the cold accumulating material packed in the regenerator (cold accumulating unit) of the refrigerator was took out from the regenerator and an appearance of the material was observed, particles broken into pieces and a generation of finely pulverized powder were observed to the cold accumulating material.

COMPARATIVE EXAMPLE 5

$Al_2O_3$ powder and $Gd_2O_3$ powder each having an average grain size of 1 μm were mixed and pulverized in ethyl alcohol by means of a ball mill for 24 hours thereby to prepare a material mixture. After the material mixture was dried, the material mixture was then calcinated at a temperature of 1500° C. for 6 hours thereby to synthesize $GdAlO_3$ as an oxide sintered body.

Next, thus obtained calcinated body was pulverized in ethyl alcohol by means of a ball mill for 6 hours. The pulverized powder was dried, and then granulated by means of a rolling granulation machine thereby to prepare granulated particles having a particle size of 0.1–0.4 mm. Thereafter, the granulated particles were inserted into a bag made of nylon-polyethylene film. After a gas content in the bag was evacuated, an opening portion of the bag was heat-sealed. In this state, an entire bag was subjected to a CIP treatment at a pressure of 800 Kg/cm$^2$ so as to increase a density of the particles. Then, the obtained granulated particles densified by the CIP treatment were sintered at a temperature of 1800° C. for 6 hours thereby to manufacture a cold accumulating material of Comparative Example 5 composed of magnetic particles each having an almost spherical shape.

When a sintering density of the cold accumulating material particle was measured, an average sintering density was excessively large to be 99.7%. In addition, an average value of the equivalent circle diameters of the crystal grains was 23 μm.

Then, thus prepared 200 g of the cold accumulating material of Comparative Example 5 was packed in a low-temperature side of the second regenerator of the two-staged expansion type GM refrigerator 10 shown in FIG. 1. In addition, 200 g of Pb cold accumulating material was packed in a high-temperature side of the second regenerator thereby to assemble a refrigerator according to Comparative Example 5, and a refrigeration test was carried out thereby to measure a refrigerating capacity at a temperature of 4.2 K.

As a result of the refrigeration test, an initial refrigerating capacity of 0.73 W was obtained at a temperature of 4.2 K. Further, the refrigerating capacity after the refrigerator was continuously operated for 240 hours was lowered to be 0.42 W. In particular, a great amount of cracks were generated to the cold accumulating material, so that the refrigerating capacity was confirmed to be lowered as time passed.

Next, embodiments of the cold accumulating material to which yttrium oxide (yttria) added as additive will be explained hereunder.

EXAMPLE 5

$Al_2O_3$ powder and $Gd_2O_3$ powder each having an average grain size of 2 μm were mixed and pulverized in ethyl alcohol by means of a ball mill for 24 hours thereby to prepare a material mixture. After the material mixture was dried, the material mixture was then calcinated at a temperature of 1500° C. for 6 hours thereby to synthesize $GdAlO_3$ as an oxide sintered body.

Next, thus obtained calcinated body was added with 3 wt % of $Y_2O_3$ (yttria) powder having an average grain size of 0.8 μm. The resultant mixture was pulverized in ethyl alcohol by means of a ball mill for 6 hours. The pulverized powder was dried, and then granulated by means of a rolling granulation machine thereby to prepare granulated particles having a particle size of 0.1–0.4 mm. Thereafter, the granulated particles were sintered at a temperature of 1700° C. for 6 hours thereby to manufacture a cold accumulating material of Example 5 composed of magnetic particles each having an almost spherical shape. In this regard, an average value of the equivalent circle diameters of the crystal grains of the cold accumulating material particle was 3.6 μm.

Then, thus prepared 200 g of the cold accumulating material of Example 5 was packed in a low-temperature side of the second regenerator of the two-staged expansion type GM refrigerator 10 shown in FIG. 1. In addition, 200 g of Pb cold accumulating material was packed in a high-temperature side of the second regenerator thereby to assemble a refrigerator according to Example 5, and a refrigeration test was carried out thereby to measure a refrigerating capacity at a temperature of 4.2 K.

As a result of the refrigeration test, an initial refrigerating capacity of 0.74 W was obtained at a temperature of 4.2 K. Further, the refrigerating capacity after the refrigerator was continuously operated for 240 hours was 0.73 W, so that a stable refrigerating performance could be confirmed. In addition, after the completion of the refrigerating test, when the cold accumulating material packed in the regenerator (cold accumulating unit) of the refrigerator was took out from the regenerator and an appearance of the material was observed, any damage was not found at all to the cold accumulating material. Therefore, according to the cold accumulating material of this Example, it becomes possible to realize a refrigerator having a high refrigerating capacity at a temperature region of about 4 K, and capable of exhibiting stable characteristics.

EXAMPLE 6

$Al_2O_3$ powder and $Gd_2O_3$ powder each having an average grain size of 2 μm were mixed and pulverized in ethyl alcohol by means of a ball mill for 24 hours thereby to prepare a material mixture. After the material mixture was dried, the material mixture was then calcinated at a temperature of 1500° C. for 6 hours thereby to synthesize GdAlO$_3$ as an oxide sintered body.

Next, thus obtained calcinated body was pulverized in ethyl alcohol by means of a ball mill for 6 hours. The pulverized powder was dried, and then granulated by means of a rolling granulation machine thereby to prepare granulated particles having a particle size of 0.1–0.4 mm. Thereafter, the granulated particles were sintered at a temperature of 1700° C. for 6 hours thereby to manufacture a cold accumulating material of Example 6 composed of magnetic particles each having an almost spherical shape. In this regard, an average value of the equivalent circle diameters of the crystal grains of the cold accumulating material particle was 3.3 μm.

Then, thus prepared 200 g of the cold accumulating material of Example 6 was packed in a low-temperature side of the second regenerator of the two-staged expansion type GM refrigerator 10 shown in FIG. 1. In addition, 200 g of Pb cold accumulating material was packed in a high-temperature side of the second regenerator thereby to assemble a refrigerator according to Example 6, and a refrigeration test was carried out thereby to measure a refrigerating capacity at a temperature of 4.2 K.

As a result of the refrigeration test, an initial refrigerating capacity of 0.73 W was obtained at a temperature of 4.2 K. Further, the refrigerating capacity after the refrigerator was continuously operated for 240 hours was 0.60 W, so that a stable refrigerating performance could be confirmed. In addition, after the completion of the refrigerating test, when the cold accumulating material packed in the regenerator (cold accumulating unit) of the refrigerator was took out from the regenerator and an appearance of the material was observed, any damage was not found at all to the cold accumulating material.

Next, embodiments of the cold accumulating material spheroidized through a heat plasma method will be explained hereunder.

EXAMPLE 7

Al$_2$O$_3$ powder and Gd$_2$O$_3$ powder each having an average grain size of 3 μm were mixed and pulverized in ethyl alcohol by means of a ball mill for 24 hours thereby to prepare a material mixture. After the material mixture was dried, the material mixture was then calcinated at a temperature of 1500° C. for 6 hours thereby to synthesize GdAlO$_3$ as an oxide sintered body.

Figure 3:
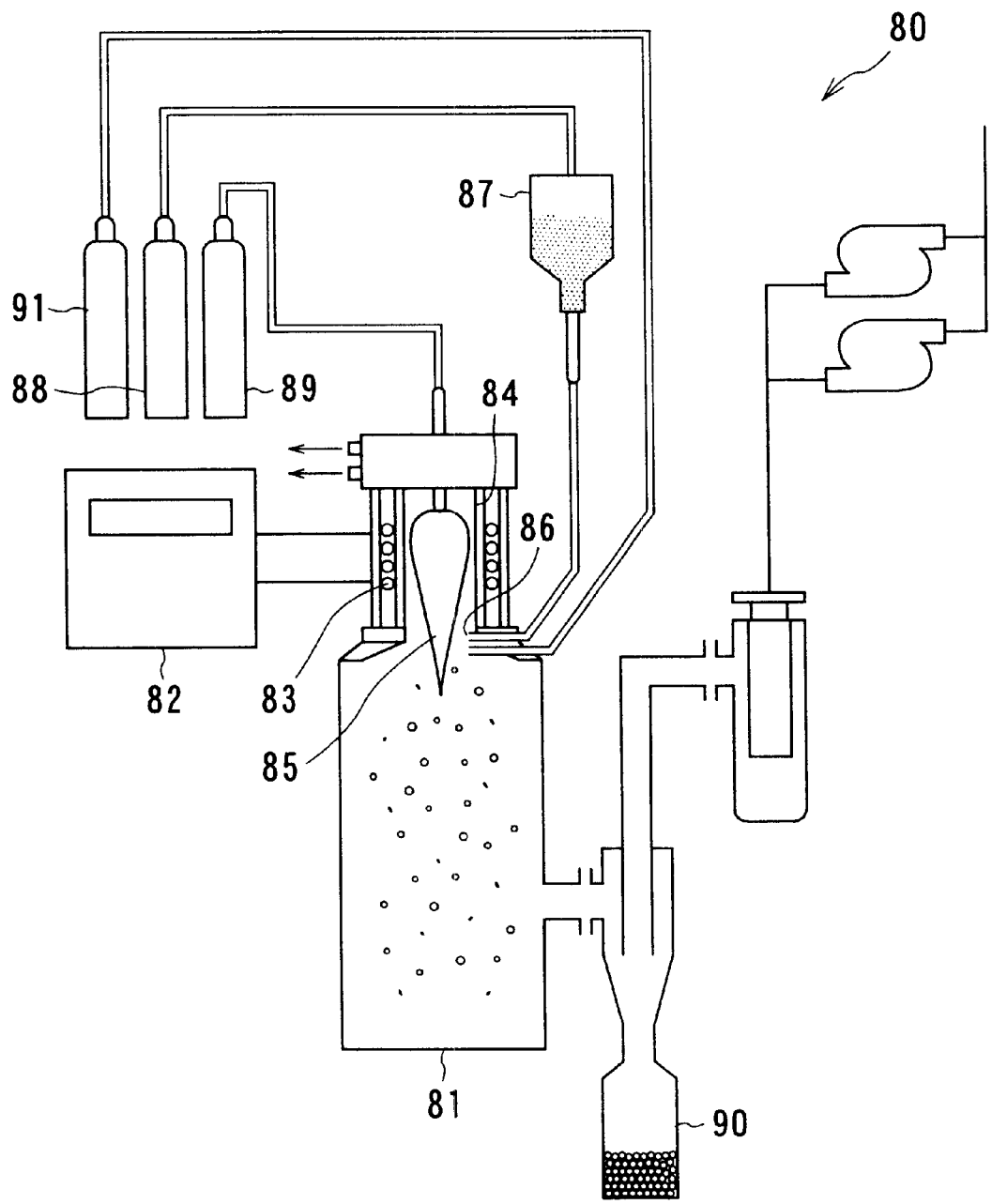
FIG. 3 is a cross sectional view showing a structure of a heat plasma apparatus.
Figure 4:
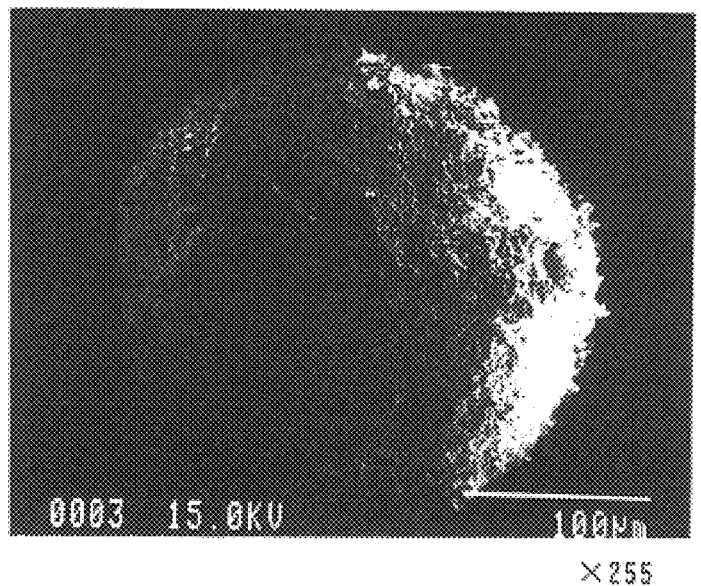
FIG. 4 is a photographic image taken by an electronic microscope for showing a surface structure of the cold accumulating material particle manufactured through a rolling granulation method.
Figure 5:
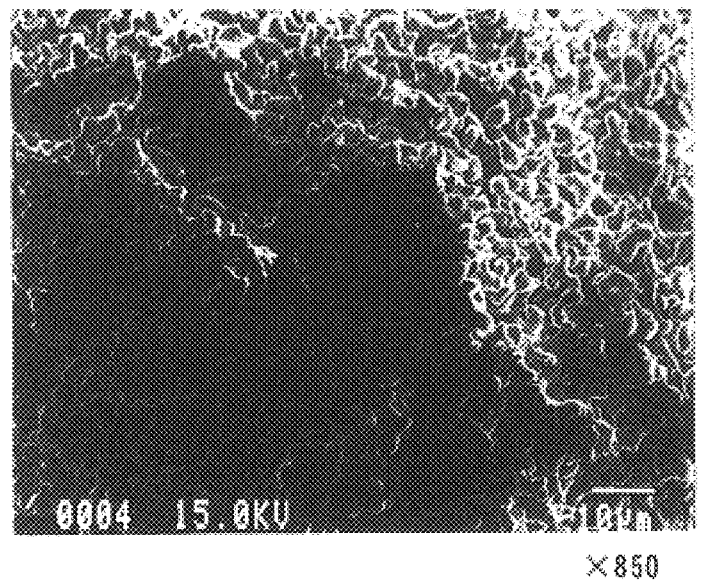
FIG. 5 is an enlarged photographic image taken by an electronic microscope for showing a center portion of the cold accumulating material particle shown in FIG. 4.
Figure 6:
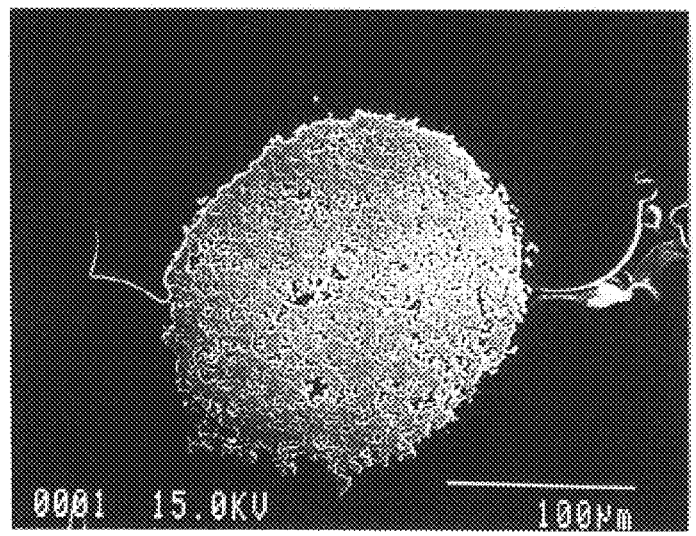
FIG. 6 is a photographic image taken by an electronic microscope for showing a cross-sectional structure of the cold accumulating material particle manufactured through a rolling granulation method.
Figure 7:
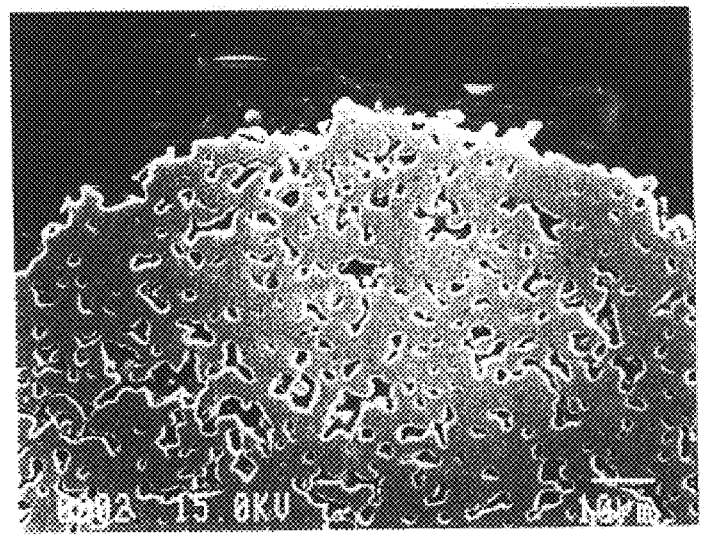
FIG. 7 is an enlarged photographic image taken by an electronic microscope for showing a peripheral portion of the cold accumulating material particle shown in FIG. 6.
Figure 8:
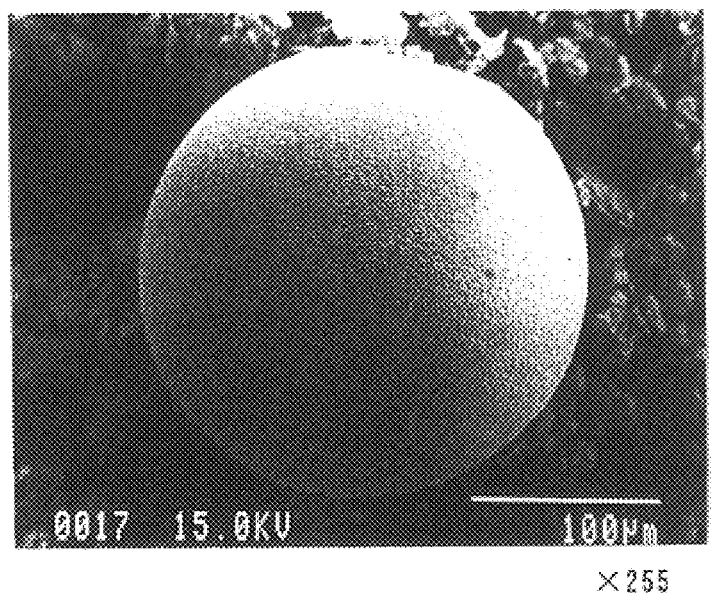
FIG. 8 is a photographic image taken by an electronic microscope for showing a surface structure of the cold accumulating material particle manufactured through a plasma-spheroidization method.
Figure 9:
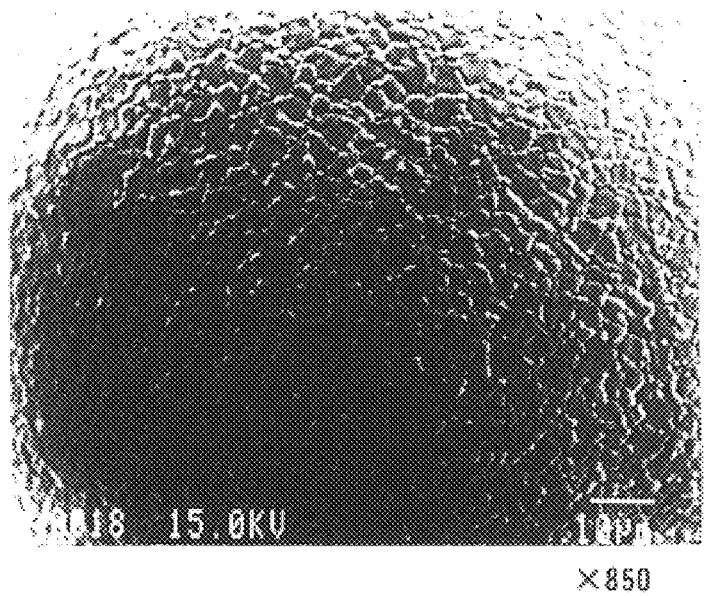
FIG. 9 is an enlarged photographic image taken by an electronic microscope for showing a center portion of the cold accumulating material particle shown in FIG. 8.
Figure 10:
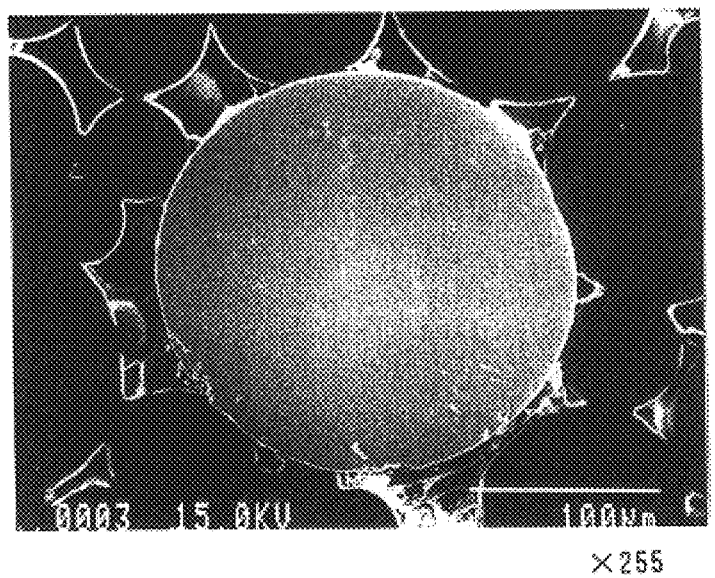
FIG. 10 is a photographic image taken by an electronic microscope for showing a cross-sectional structure of the cold accumulating material particle manufactured through a plasma-spheroidization method.
Figure 11:
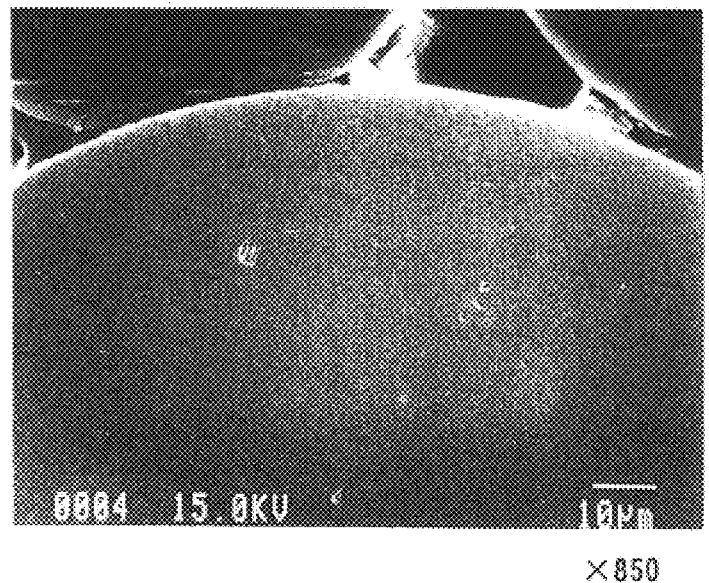
FIG. 11 is an enlarged photographic image taken by an electronic microscope for showing a peripheral portion of the cold accumulating material particle shown in FIG. 10.

Next, thus obtained calcinated body was pulverized in ethyl alcohol by means of a ball mill for 6 hours. The pulverized powder was dried, and then granulated by means of a rolling granulation machine thereby to prepare granulated particles having a particle size of 0.1–0.4 mm. Thereafter, the granulated particles were supplied into a plasma flame 85 generated at the heat-plasma apparatus 80 shown in FIG. 3 so as to be molten. Then, the molten particles were rapidly cooled and solidified in a state of spherical shape as they were, thereby to prepare magnetic particles each having an almost spherical shape. The magnetic particles were subjected to a heat treatment in an air atmosphere at a temperature of 1700° C. for 2 hours thereby to manufacture a cold accumulating material of Example 7.

200 of particles were sampled at random from thus manufactured spherical cold accumulating material particles, and surface conditions were observed by means of a scanning-type electron microscope (SEM). As a result, there existed 5 particles each formed with 2 or more of cracks each having a length of 10 μm or more, so that an existing ratio of such defective particles was 2.5%. In this regard, an average value of the equivalent circle diameters of the crystal grains of the cold accumulating material particle was 6.4 μm.

Then, thus prepared 200 g of the cold accumulating material of Example 7 was packed in a low-temperature side of the second regenerator of the two-staged expansion type GM refrigerator 10 shown in FIG. 1. In addition, 200 g of Pb cold accumulating material was packed in a high-temperature side of the second regenerator thereby to assemble a refrigerator according to Example 7, and a refrigeration test was carried out thereby to measure a refrigerating capacity at a temperature of 4.2 K.

As a result of the refrigeration test, an initial refrigerating capacity of 0.72 W was obtained at a temperature of 4.2 K. Further, the refrigerating capacity after the refrigerator was continuously operated for 240 hours was 0.71 W, so that a stable refrigerating performance could be confirmed. In addition, after the completion of the refrigerating test, when the cold accumulating material packed in the regenerator (cold accumulating unit) of the refrigerator was took out from the regenerator and an appearance of the material was observed, any damage was not found at all to the cold accumulating material.

EXAMPLE 8

Al$_2$O$_3$ powder and Gd$_2$O$_3$ powder each having an average grain size of 3 μm were mixed and pulverized in ethyl alcohol by means of a ball mill for 24 hours thereby to prepare a material mixture. After the material mixture was dried, the material mixture was then calcinated at a temperature of 1500° C. for 6 hours thereby to synthesize GdAlO$_3$ as an oxide sintered body.

Next, thus obtained calcinated body was pulverized in ethyl alcohol by means of a ball mill for 6 hours. The pulverized powder was dried, and then granulated by means of a rolling granulation machine thereby to prepare granulated particles having a particle size of 0.1–0.4 mm. Thereafter, the obtained granulated particles were sintered at a temperature of 1700° C. for 6 hours thereby to manufacture a cold accumulating material of Example 8 composed of magnetic particles each having an almost spherical shape.

200 of particles were sampled at random from thus manufactured spherical cold accumulating material particles, and surface conditions were observed by means of a scanning-type electron microscope (SEM). As a result, there existed 56 particles each formed with 2 or more of cracks each having a length of 10 μm or more, so that an existing ratio of such defective particles was 28%. In this regard, an average value of the equivalent circle diameters of the crystal grains of the cold accumulating material particle was 3.1 μm.

Then, thus prepared 200 g of the cold accumulating material of Example 8 was packed in a low-temperature side of the second regenerator of the two-staged expansion type GM refrigerator 10 shown in FIG. 1. In addition, 200 g of Pb cold accumulating material was packed in a high-temperature side of the second regenerator thereby to assemble a refrigerator according to Example 8, and a refrigeration test was carried out thereby to measure a refrigerating capacity at a temperature of 4.2 K.

As a result of the refrigeration test, an initial refrigerating capacity of 0.73 W was obtained at a temperature of 4.2 K.

Further, the refrigerating capacity after the refrigerator was continuously operated for 240 hours was 0.61 W, so that a stable refrigerating performance could be confirmed. In addition, after the completion of the refrigerating test, when the cold accumulating material packed in the regenerator (cold accumulating unit) of the refrigerator was took out from the regenerator and an appearance of the material was observed, any damage was not found at all to the cold accumulating material.

EXAMPLE 9

$Al_2O_3$ powder and $Gd_2O_3$ powder each having an average grain size of 8 μm were mixed and pulverized in ethyl alcohol by means of a ball mill for 24 hours thereby to prepare a material mixture. After the material mixture was dried, the material mixture was then calcinated at a temperature of 1500° C. for 6 hours thereby to synthesize $GdAlO_3$ as an oxide sintered body.

Next, thus obtained calcinated body was pulverized in ethyl alcohol by means of a ball mill for 6 hours. The pulverized powder was dried, and then granulated by means of a rolling granulation machine thereby to prepare granulated particles having a particle size of 0.1–0.4 mm. Thereafter, the granulated particles were supplied into a plasma flame 85 generated at the heat-plasma apparatus 80 shown in FIG. 3 so as to be molten. Then, the molten particles were rapidly cooled and solidified in a state of spherical shape as they were, thereby to prepare magnetic particles each having an almost spherical shape. The magnetic particles were subjected to a heat treatment in an air atmosphere at a temperature of 1700° C. for 2 hours thereby to manufacture a cold accumulating material of Example 9.

200 of particles were sampled at random from thus manufactured spherical cold accumulating material particles. Each of the particles was buried into a transparent resin, and the resin was polished until cross-sectional areas of the respective particles were exposed outside. Then, the surface conditions were observed by means of a scanning-type electron microscope (SEM). As a result, there existed 4 particles each having a surface roughness of 10 μm or more in terms of maximum height, so that an existing ratio of such defective particles was 2%. In this regard, an average value of the equivalent circle diameters of the crystal grains of the cold accumulating material particle was 5.4 μm.

Then, thus prepared 200 g of the cold accumulating material of Example 9 was packed in a low-temperature side of the second regenerator of the two-staged expansion type GM refrigerator 10 shown in FIG. 1. In addition, 200 g of Pb cold accumulating material was packed in a high-temperature side of the second regenerator thereby to assemble a refrigerator according to Example 9, and a refrigeration test was carried out thereby to measure a refrigerating capacity at a temperature of 4.2 K.

As a result of the refrigeration test, an initial refrigerating capacity of 0.73 W was obtained at a temperature of 4.2 K. Further, the refrigerating capacity after the refrigerator was continuously operated for 240 hours was 0.72 W, so that a stable refrigerating performance could be confirmed. In addition, after the completion of the refrigerating test, when the cold accumulating material packed in the regenerator (cold accumulating unit) of the refrigerator was took out from the regenerator and an appearance of the material was observed, any damage was not found at all to the cold accumulating material.

EXAMPLE 10

$Al_2O_3$ powder and $Gd_2O_3$ powder each having an average grain size of 8 μm were mixed and pulverized in ethyl alcohol by means of a ball mill for 24 hours thereby to prepare a material mixture. After the material mixture was dried, the material mixture was then calcinated at a temperature of 1500° C. for 6 hours thereby to synthesize $GdAlO_3$ as an oxide sintered body.

Next, thus obtained calcinated body was pulverized in ethyl alcohol by means of a ball mill for 6 hours. The pulverized powder was dried, and then granulated by means of a rolling granulation machine thereby to prepare granulated particles having a particle size of 0.1–0.4 mm. Thereafter, the granulated particles were sintered at a temperature of 1700° C. for 6 hours thereby to manufacture a cold accumulating material of Example 10 composed of magnetic particles each having an almost spherical shape.

200 of particles were sampled at random from thus manufactured spherical cold accumulating material particles. Each of the particles was buried into a transparent resin, and the resin was polished until cross-sectional areas of the respective particles were exposed outside. Then, the surface conditions were observed by means of a scanning-type electron microscope (SEM). As a result, there existed 70 particles each having a surface roughness of 10 μm or more in terms of maximum height, so that an existing ratio of such defective particles was 35%. In this regard, an average value of the equivalent circle diameters of the crystal grains of the cold accumulating material particle was 8.5 μm.

Then, thus prepared 200 g of the cold accumulating material of Example 10 was packed in a low-temperature side of the second regenerator of the two-staged expansion type GM refrigerator 10 shown in FIG. 1. In addition, 200 g of Pb cold accumulating material was packed in a high-temperature side of the second regenerator thereby to assemble a refrigerator according to Example 10, and a refrigeration test was carried out thereby to measure a refrigerating capacity at a temperature of 4.2 K.

As a result of the refrigeration test, an initial refrigerating capacity of 0.71 W was obtained at a temperature of 4.2 K. Further, the refrigerating capacity after the refrigerator was continuously operated for 240 hours was 0.59 W, so that a stable refrigerating performance could be confirmed. In addition, after the completion of the refrigerating test, when the cold accumulating material packed in the regenerator (cold accumulating unit) of the refrigerator was took out from the regenerator and an appearance of the material was observed, any damage was not found at all to the cold accumulating material.

Next, the effect of conducting the heat treatment to the magnetic particles prepared by the heat plasma method will be explained hereunder with reference to the following examples.

EXAMPLE 11

$Al_2O_3$ powder and $Gd_2O_3$ powder each having an average grain size of 8 μm were mixed and pulverized in ethyl alcohol by means of a ball mill for 24 hours thereby to prepare a material mixture. After the material mixture was dried, the material mixture was then calcinated at a temperature of 1500° C. for 6 hours thereby to synthesize $GdAlO_3$ as an oxide sintered body.

Next, thus obtained calcinated body was pulverized in ethyl alcohol by means of a ball mill for 6 hours. The pulverized powder was dried, and then granulated by means of a rolling granulation machine thereby to prepare granulated particles having a particle size of 0.1–0.4 mm. Thereafter, the granulated particles were supplied into a plasma flame 85 generated at the heat-plasma apparatus 80 shown in FIG. 3 so as to be molten. Then, the molten particles were rapidly cooled and solidified in a state of spherical shape as they were, thereby to prepare magnetic particles each having an almost spherical shape. The magnetic particles were subjected to a heat treatment in an air atmosphere at a temperature of 1700° C. for 2 hours thereby to manufacture a cold accumulating material of Example 11 composed of magnetic particles having a good surface characteristic.

200 of particles were sampled at random from thus manufactured spherical cold accumulating material particles. Each of the particles was buried into a transparent resin, and the resin was polished until cross-sectional areas of the respective particles were exposed outside. Then, the surface conditions such as surface structure and cross-sectional structure of the magnetic particles were observed by means of a scanning-type electron microscope (SEM). As a result, the photographic images were obtained as shown in FIGS. 8–11. On the basis of these photographic images of the structures, a shape analysis was conducted. As a result, there was not any particle having a surface roughness of 10 $\mu$m or more in terms of maximum height. In this regard, an average value of the equivalent circle diameters of the crystal grains of the cold accumulating material particle was 6.6 $\mu$m.

Then, thus prepared 50 g of the cold accumulating material of Example 11 was packed in a low-temperature side of the second regenerator of the two-staged expansion type GM refrigerator 10 shown in FIG. 1. On the other hand, 150 g of HoCu$_2$ cold accumulating material was packed in a high-temperature side of the second regenerator. In addition, 200 g of Pb cold accumulating material was packed in a higher-temperature side of the second regenerator thereby to assemble a refrigerator according to Example 11, and a refrigeration test was carried out under an operating frequency of 1 Hz thereby to measure a refrigerating capacity at a temperature of 4.2 K.

As a result of the refrigeration test, an initial refrigerating capacity of 0.86 W was obtained at a temperature of 4.2 K. Further, the refrigerating capacity after the refrigerator was continuously operated for 240 hours was 0.85 W, so that a stable refrigerating performance could be confirmed. In addition, after the completion of the refrigerating test, when the cold accumulating material packed in the regenerator (cold accumulating unit) of the refrigerator was took out from the regenerator and an appearance of the material was observed, any damage was not found at all to the cold accumulating material.

EXAMPLE 12

The same procedures as in Example 11 were repeated except that the heat treatment was not conducted to the magnetic particles spheroidized in accordance with the heat plasma method, thereby to manufacture magnetic particles. The resultant magnetic particles were adopted as a cold accumulating material of Example 12 as they were.

200 of particles were sampled at random from thus manufactured cold accumulating material particles. Each of the particles was buried into a transparent resin, and the resin was polished until cross-sectional areas of the respective particles were exposed outside. Then, the cross-sectional areas of the magnetic particles were observed by means of a scanning-type electron microscope (SEM). As a result, there were two particles each having a surface roughness of 10 $\mu$m or more in terms of maximum height. Therefore, an existing ratio of the defective particles was 1%. In addition, an average value of the equivalent circle diameters of the crystal grains of the cold accumulating material particles was 5.2 $\mu$m.

Then, thus prepared 200 g of the cold accumulating material of Example 12 was packed in the lowest-temperature side of the second regenerator of the two-staged expansion type GM refrigerator 10 shown in FIG. 1. On the other hand, 150 g of HoCu$_2$ cold accumulating material was packed in a medium-temperature portion of the second regenerator. In addition, 200 g of Pb cold accumulating material was packed in a high-temperature side of the second regenerator thereby to assemble a refrigerator according to Example 12, and a refrigeration test was carried out as the same manner as in Example 11 thereby to measure a refrigerating capacity at a temperature of 4.2 K.

As a result of the above refrigeration test, an initial refrigerating capacity of 0.41 W was obtained at a temperature of 4.2 K. That is, as is clear from the comparison between Example 11 and Example 12, the following effect was confirmed. Namely, when the heat treatment was further conducted to the magnetic particles spheroidized through the heat plasma method, non-equilibrium phases such as amorphous phase formed in the particle structure was re-synthesized into crystal phases such as perovskite phase excellent in specific-heat characteristic, so that the refrigerating capacity at 4 K became high thereby to remarkably improve the refrigerating capacity.

Next, embodiments of a cold accumulating material in which an existing ratio of the magnetic particles formed with pore or void is controlled will be explained hereunder with reference to the following examples.

EXAMPLE 13

Al$_2$O$_3$ powder and Gd$_2$O$_3$ powder each having an average grain size of 6 $\mu$m were mixed and pulverized in ethyl alcohol by means of a ball mill for 24 hours thereby to prepare a material mixture. After the material mixture was dried, the material mixture was then calcinated at a temperature of 1200° C. for 6 hours thereby to synthesize GdAlO$_3$ as an oxide sintered body.

Next, thus obtained calcinated body was pulverized in ethyl alcohol by means of a ball mill for 6 hours. The pulverized powder was dried, and then granulated by means of a rolling granulation machine thereby to prepare granulated particles having a particle size of 0.1–0.4 mm. Thereafter, the granulated particles were supplied to an end portion of the plasma flame 85 generated at the heat-plasma apparatus 80 shown in FIG. 3 so as to be molten. Then, the molten particles were solidified in a state of spherical shape as they were, thereby to manufacture a cold accumulating material of Example 13 composed of magnetic particles each having an almost spherical shape.

200 of particles were sampled at random from thus manufactured cold accumulating material particles. Each of the particles was buried into a transparent resin, and the resin was polished until cross-sectional areas of the respective particles were exposed outside. Then, the cross-sectional areas of the magnetic particles were observed by means of a scanning-type electron microscope (SEM). As a result, there were 34 particles each formed with pore or void having a maximum width of 20 $\mu$m or more. Therefore, an existing ratio of the defective particles was 17%. In addition, an average value of the equivalent circle diameters of the crystal grains of the cold accumulating material particles was 6.5 $\mu$m.

Then, thus prepared 200 g of the cold accumulating material of Example 13 was packed in a low-temperature side of the second regenerator of the two-staged expansion type GM refrigerator 10 shown in FIG. 1. In addition, 200 g of Pb cold accumulating material was packed in a high-temperature side of the second regenerator thereby to assemble a refrigerator according to Example 13, and a refrigeration test was carried out thereby to measure a refrigerating capacity at a temperature of 4.2 K.

As a result of the refrigeration test, an initial refrigerating capacity of 0.72 W was obtained at a temperature of 4.2 K. Further, the refrigerating capacity after the refrigerator was continuously operated for 240 hours was 0.72 W, so that a stable refrigerating performance could be confirmed. In addition, after the completion of the refrigerating test, when the cold accumulating material packed in the regenerator of the refrigerator was took out from the regenerator and an appearance of the material was observed, any damage was not found at all to the cold accumulating material.

EXAMPLE 14

$Al_2O_3$ powder and $Gd_2O_3$ powder each having an average grain size of 6 μm were mixed and pulverized in ethyl alcohol by means of a ball mill for 24 hours thereby to prepare a material mixture. After the material mixture was dried, the material mixture was then calcinated at a temperature of 1200° C. for 6 hours thereby to synthesize $GdAlO_3$ as an oxide sintered body.

Next, thus obtained calcinated body was pulverized in ethyl alcohol by means of a ball mill for 6 hours. The pulverized powder was dried, and then granulated by means of a rolling granulation machine thereby to prepare granulated particles having a particle size of 0.1–0.4 mm. Thereafter, the granulated particles were sintered at a temperature of 1600° C. for 5 hours thereby to manufacture a cold accumulating material of Example 14 composed of magnetic particles each having an almost spherical shape.

200 of particles were sampled at random from thus manufactured cold accumulating material particles. Each of the particles was buried into a transparent resin, and the resin was polished until cross-sectional areas of the respective particles were exposed outside. Then, the cross-sectional areas of the magnetic particles were observed by means of a scanning-type electron microscope (SEM). As a result, there were 84 particles each formed with pore or void having a maximum width of 20 μm or more. Therefore, an existing ratio of the defective particles was 42%. In addition, an average value of the equivalent circle diameters of the crystal grains of the cold accumulating material particles was 6.1 μm.

Then, thus prepared 200 g of the cold accumulating material of Example 14 was packed in a low-temperature side of the second regenerator of the two-staged expansion type GM refrigerator 10 shown in FIG. 1. In addition, 200 g of Pb cold accumulating material was packed in a high-temperature side of the second regenerator thereby to assemble a refrigerator according to Example 14, and a refrigeration test was carried out thereby to measure a refrigerating capacity at a temperature of 4.2 K.

As a result of the refrigeration test, an initial refrigerating capacity of 0.71 W was obtained at a temperature of 4.2 K. Further, the refrigerating capacity after the refrigerator was continuously operated for 240 hours was 0.58 W, so that a stable refrigerating performance could be confirmed. In addition, after the completion of the refrigerating test, when the cold accumulating material packed in the regenerator of the refrigerator was took out from the regenerator and an appearance of the material was observed, any damage was not found at all to the cold accumulating material.

Next, embodiments of a cold accumulating material in which an amount of Si, Na and Fe is controlled will be explained hereunder with reference to the following examples.

EXAMPLE 15

$Al_2O_3$ powder and $Gd_2O_3$ powder each having an average grain size of 1 μm were mixed and pulverized in ethyl alcohol by means of a ball mill for 4 hours thereby to prepare a material mixture containing Si, Na and Fe at a total amount of 230 ppm. After the material mixture was dried, the material mixture was then calcinated at a temperature of 1400° C. for 3 hours thereby to synthesize $GdAlO_3$ as an oxide sintered body.

Next, thus obtained calcinated body was pulverized in ethyl alcohol by means of a ball mill for 3 hours. The pulverized powder was dried, and then granulated by means of a rolling granulation machine thereby to prepare granulated particles having a particle size of 0.1–0.4 mm. Thereafter, the granulated particles were sintered at a temperature of 1700° C. for 6 hours thereby to manufacture a cold accumulating material of Example 15 composed of magnetic particles each having an almost spherical shape. The above manufacturing processes were performed in a clean room.

A total amount of Si, Na and Fe contained in thus manufactured cold accumulating material particles was analyzed by ICP method. As a result, the total amount was 540 ppm. In addition, an average value of the equivalent circle diameters of the crystal grains of the cold accumulating material particles was 1.5 μm.

Then, thus prepared 200 g of the cold accumulating material of Example 15 was packed in a low-temperature side of the second regenerator of the two-staged expansion type GM refrigerator 10 shown in FIG. 1. In addition, 200 g of Pb cold accumulating material was packed in a high-temperature side of the second regenerator thereby to assemble a refrigerator according to Example 15, and a refrigeration test was carried out thereby to measure a refrigerating capacity at a temperature of 4.2 K.

As a result of the refrigeration test, an initial refrigerating capacity of 0.68 W was obtained at a temperature of 4.2 K. Further, the refrigerating capacity after the refrigerator was continuously operated for 240 hours was 0.65 W, so that a stable refrigerating performance could be confirmed. In addition, after the completion of the refrigerating test, when the cold accumulating material packed in the regenerator of the refrigerator was took out from the regenerator and an appearance of the material was observed, any damage was not found at all to the cold accumulating material.

EXAMPLE 16

$Al_2O_3$ powder and $Gd_2O_3$ powder each having an average grain size of 1 μm were mixed and pulverized in ethyl alcohol by means of a ball mill for 4 hours thereby to prepare a material mixture containing Si, Na and Fe at a total amount of 2.3 wt %. After the material mixture was dried, the material mixture was then calcinated at a temperature of 1400° C. for 3 hours thereby to synthesize $GdAlO_3$ as an oxide sintered body.

Next, thus obtained calcinated body was pulverized in ethyl alcohol by means of a ball mill for 3 hours. The pulverized powder was dried, and then granulated by means of a rolling granulation machine thereby to prepare granulated particles having a particle size of 0.1–0.4 mm. Thereafter, the granulated particles were sintered at a temperature of 1700° C. for 6 hours thereby to manufacture a cold accumulating material of Example 16 composed of magnetic particles each having an almost spherical shape.

A total amount of Si, Na and Fe contained in thus manufactured cold accumulating material particles was analyzed by ICP method. As a result, the total amount was 2.4 wt %. In addition, an average value of the equivalent circle diameters of the crystal grains of the cold accumulating material particles was 1.3 μm.

Then, thus prepared 200 g of the cold accumulating material of Example 16 was packed in a low-temperature side of the second regenerator of the two-staged expansion type GM refrigerator 10 shown in FIG. 1. In addition, 200 g of Pb cold accumulating material was packed in a high-temperature side of the second regenerator thereby to assemble a refrigerator according to Example 16, and a refrigeration test was carried out thereby to measure a refrigerating capacity at a temperature of 4.2 K.

As a result of the refrigeration test, an initial refrigerating capacity of 0.75 W was obtained at a temperature of 4.2 K. Further, the refrigerating capacity after the refrigerator was continuously operated for 240 hours was 0.59 W, so that a stable refrigerating performance could be confirmed. In addition, after the completion of the refrigerating test, when the cold accumulating material packed in the regenerator of the refrigerator was took out from the regenerator and an appearance of the material was observed, any damage was not found at all to the cold accumulating material.

COMPARATIVE EXAMPLE 6

$Al_2O_3$ powder and $Gd_2O_3$ powder each having an average grain size of 1 μm were mixed and pulverized in ethyl alcohol by means of a ball mill for 4 hours thereby to prepare a material mixture containing Si, Na and Fe at a total amount of 1 ppm. After the material mixture was dried, the material mixture was then calcinated at a temperature of 1400° C. for 3 hours thereby to synthesize $GdAlO_3$ as an oxide sintered body.

Next, thus obtained calcinated body was pulverized in ethyl alcohol by means of a ball mill for 3 hours. The pulverized powder was dried, and then granulated by means of a rolling granulation machine thereby to prepare granulated particles having a particle size of 0.1–0.4 mm. Thereafter, the granulated particles were sintered at a temperature of 1700° C. for 6 hours thereby to manufacture a cold accumulating material of Comparative Example 6 composed of magnetic particles each having an almost spherical shape. The above manufacturing processes were performed in a clean room.

A total amount of Si, Na and Fe contained in thus manufactured cold accumulating material particles was analyzed by ICP method. As a result, the total amount was 2 ppm. In addition, an average value of the equivalent circle diameters of the crystal grains of the cold accumulating material particles was 24 μm.

Then, thus prepared 200 g of the cold accumulating material of Comparative Example 6 was packed in a low-temperature side of the second regenerator of the two-staged expansion type GM refrigerator 10 shown in FIG. 1. In addition, 200 g of Pb cold accumulating material was packed in a high-temperature side of the second regenerator thereby to assemble a refrigerator according to Comparative Example 6, and a refrigeration test was carried out thereby to measure a refrigerating capacity at a temperature of 4.2 K.

As a result of the refrigeration test, an initial refrigerating capacity of 0.69 W was obtained at a temperature of 4.2 K. Further, the refrigerating capacity after the refrigerator was continuously operated for 240 hours was lowered to be 0.44 W, so that the refrigerating performance was confirmed to be remarkably lowered. In addition, after the completion of the refrigerating test, when the cold accumulating material packed in the regenerator of the refrigerator was took out from the regenerator and an appearance of the material was observed, particles broken into pieces and a generation of finely pulverized powder were observed to the cold accumulating material.

EXAMPLE 17

$Fe_2O_3$ powder, $SiO_2$ powder and $Gd_2O_3$ powder each having an average grain size of 1 μm were mixed so as to provide a molar ratio of 4:2:5 and then pulverized in ethyl alcohol by means of a ball mill for 4 hours thereby to prepare a material mixture containing sodium (Na) at an amount of 14 ppm. After the material mixture was dried, the material mixture was then calcinated at a temperature of 1400° C. for 3 hours thereby to synthesize $GdFe_{0.8}Si_{0.2}O_3$ as an oxide sintered body. The synthesized mixture was dried and then sintered at a temperature of 1500° C. for 6 hours.

Next, thus obtained calcinated body was pulverized in ethyl alcohol by means of a ball mill for 6 hours. The pulverized powder was dried, and then granulated by means of a rolling granulation machine thereby to prepare granulated particles having a particle size of 0.1–0.4 mm. Thereafter, the granulated particles were supplied to the plasma apparatus 80 shown in FIG. 3 so as to be molten. Then, the molten particles were rapidly cooled and solidified in a state of spherical shape as they were, thereby to prepare spherical particles each having a composition of $GdFe_{0.8}Si_{0.2}O_3$. The spherical particles were subjected to a heat treatment in air atmosphere at a temperature of 1700° C. for 2 hours thereby to manufacture a cold accumulating material of Example 17 composed of the magnetic particles each having an almost spherical shape.

An impurity amount of Na contained in thus manufactured cold accumulating material particles having a composition of $GdFe_{0.8}Si_{0.2}O_3$ were analyzed by ICP method. As a result, the amount of Na was 15 ppm. In addition, an average value of the equivalent circle diameters of the crystal grains of the cold accumulating material particles was 6.1 μm.

Then, thus prepared 50 g of the cold accumulating material of Example 17 was packed in a low-temperature side of the second regenerator of the two-staged expansion type GM refrigerator 10 shown in FIG. 1. On the other hand, 150 g of $HoCu_2$ cold accumulating material was packed in a medium-temperature portion of the second regenerator. In addition, 200 g of Pb cold accumulating material was packed in a higher-temperature side of the second regenerator thereby to assemble a refrigerator according to Example 17, and a refrigeration test was carried out under an operating frequency of 1 Hz thereby to measure a refrigerating capacity at a temperature of 4.2 K.

As a result of the refrigeration test, an initial refrigerating capacity of 0.79 W was obtained at a temperature of 4.2 K. Further, the refrigerating capacity after the refrigerator was continuously operated for 240 hours was 0.78 W, so that a stable refrigerating performance could be confirmed. In addition, after the completion of the refrigerating test, when the cold accumulating material packed in the regenerator of the refrigerator was took out from the regenerator and an appearance of the material was observed, any damage was not found at all to the cold accumulating material.

EXAMPLE 18

$Fe_2O_3$ powder, $SiO_2$ powder and $Gd_2O_3$ powder each having an average grain size of 1 μm were mixed so as to provide a molar ratio of 4:2:5 and then pulverized in ethyl alcohol by means of a ball mill for 4 hours thereby to prepare a material mixture containing sodium (Na) at amount of 2.1 mass %. After the material mixture was dried, the material mixture was then calcinated at a temperature of 1400° C. for 3 hours thereby to synthesize $GdFe_{0.8}Si_{0.2}O_3$ as an oxide sintered body.

Next, thus obtained calcinated body was pulverized in ethyl alcohol by means of a ball mill for 6 hours. The pulverized powder was dried, and then granulated by means of a rolling granulation machine thereby to prepare granulated particles having a particle size of 0.1–0.4 mm. Thereafter, the granulated particles were supplied to the plasma apparatus 80 shown in FIG. 3 so as to be molten. Then, the molten particles were rapidly cooled and solidified in a state of spherical shape as they were, thereby to prepare spherical particles each having a composition of $GdFe_{0.8}Si_{0.2}O_3$. Then, the spherical particles were subjected to a heat treatment in air atmosphere at a temperature of 1700° C. for 2 hours thereby to manufacture a cold accumulating material of Example 18 composed of the magnetic particles each having an almost spherical shape.

An impurity amount of Na contained in thus manufactured cold accumulating material particles having a composition of $GdFe_{0.8}Si_{0.2}O_3$ were analyzed by ICP method. As a result, the amount of Na was 2.1 mass %. In addition, an average value of the equivalent circle diameters of the crystal grains of the cold accumulating material particles was 5.9 μm.

Then, as the same manner as in Example 11, thus prepared 50 g of the cold accumulating material of Example 18 was packed in a lowest-temperature side of the second regenerator of the two-staged expansion type GM refrigerator 10 shown in FIG. 1. On the other hand, 150 g of $HoCu_2$ cold accumulating material was packed in a medium-temperature portion of the second regenerator. In addition, 200 g of Pb cold accumulating material was packed in a higher-temperature side of the second regenerator thereby to assemble a refrigerator according to Example 18, and a refrigeration test was carried out under the same condition as in Example 17 thereby to measure a refrigerating capacity at a temperature of 4.2 K.

As a result of the refrigeration test, an initial refrigerating capacity of 0.77 W was obtained at a temperature of 4.2 K. Further, the refrigerating capacity after the refrigerator was continuously operated for 240 hours was 0.63 W, so that a stable refrigerating performance could be confirmed. In addition, after the completion of the refrigerating test, when the cold accumulating material packed in the regenerator of the refrigerator was took out from the regenerator and an appearance of the material was observed, however, any damage was not found at all to the cold accumulating material.

Next, embodiments of a cold accumulating material having a composition expressed by the aforementioned general formula of $Gd_{1-x}R_xA_{1-y}B_yO_3$ will be explained hereunder with reference to the following examples.

EXAMPLE 19

$Al_2O_3$ powder, $Tb_2O_3$ powder and $Gd_2O_3$ powder each having an average grain size of 3 μm were mixed so as to obtain an aimed composition of $Gd_{0.9x}Tb_{0.1}AlO_3$, and then pulverized in ethyl alcohol by means of a ball mill for 24 hours thereby to prepare a material mixture. After the material mixture was dried, the material mixture was then calcinated at a temperature of 1500° C. for 6 hours thereby to synthesize an oxide sintered body.

Next, thus obtained calcinated body was pulverized in ethyl alcohol by means of a ball mill for 6 hours. The pulverized powder was dried, and then granulated by means of a rolling granulation machine thereby to prepare granulated particles having a particle size of 0.1–0.4 mm. Thereafter, the granulated particles were supplied into the plasma flame 85 generated at the plasma apparatus 80 shown in FIG. 3 so as to be molten. Then, the molten particles were rapidly cooled and solidified in a state of spherical shape as they were, thereby to prepare spherical magnetic particles having a composition of $Gd_{0.9}Tb_{0.1}AlO_3$. Then, the spherical particles were subjected to a heat treatment in air atmosphere at a temperature of 1700° C. for 2 hours thereby to manufacture a cold accumulating material of Example 19 composed of the magnetic particles each having an almost spherical shape.

A specific heat at extremely low temperature region of thus manufactured cold accumulating material having a composition of $Gd_{0.9}Tb_{0.1}AlO_3$ was measured by a thermal insulating method. As a result, the specific heat at 4.5 K 0.32 $J/Kcm^3$. Further, 200 of particles were sampled at random from thus manufactured spherical cold accumulating material particles, and surface conditions were observed by means of a scanning-type electron microscope (SEM). As a result, there existed 5 particles each formed with 2 or more of cracks each having a length of 10 μm or more, so that an existing ratio of such defective particles was 2.5%. In this regard, an average value of the equivalent circle diameters of the crystal grains of the cold accumulating material particle was 5.9 μm.

Then, 80 g of the cold accumulating material of Example 19 was packed in a lowest-temperature side of the second regenerator of the two-staged expansion type GM refrigerator 10 shown in FIG. 1. On the other hand, 100 g of $HoCu_2$ cold accumulating material was packed in a medium-temperature portion of the second regenerator. In addition, 150 g of Pb cold accumulating material was packed in a higher-temperature side of the second regenerator thereby to assemble a refrigerator according to Example 19, and a refrigeration test was carried out under the same condition as in Example 17 thereby to measure a refrigerating capacity at a temperature of 4.2 K.

As a result of the refrigeration test, an initial refrigerating capacity of 0.79 W was obtained at a temperature of 4.2 K. Further, the refrigerating capacity after the refrigerator was continuously operated for 240 hours was 0.77 W, so that a stable refrigerating performance could be confirmed. In addition, after the completion of the refrigerating test, when the cold accumulating material packed in the regenerator of the refrigerator was took out from the regenerator and an appearance of the material was observed, however, any damage was not found at all to the cold accumulating material.

EXAMPLE 20

The same procedures as in Example 19 were repeated except that the material powders were mixed so that the resultant magnetic particles should obtain a composition of $GdAlO_3$, thereby to prepare a cold accumulating material of Example 20. Thus obtained cold accumulating material was packed in the second regenerator of the GM refrigerator and the refrigeration test was carried out under the same condition as in Example 19. As a result, an initial refrigerating capacity at a temperature of 4.2 K was 0.53 W.

EXAMPLES 21–41

The same procedures as in Example 19 were repeated except that the metal oxide powders were mixed so that the resultant magnetic particles finally obtained the compositions indicated in left column of Table 1, thereby to prepare the respective cold accumulating materials of Examples 21–41. With respect to each of the cold accumulating material, the specific heats at the extremely low temperature range were measured in accordance with the thermal insulation method. The results are shown in Table 1. A range of average values of the equivalent circle diameters of the crystal grains of the respective magnetic particles was 5.0–6.3 $\mu$m.

Further, 80 g of the cold accumulating material was sampled from each of thus manufactured materials of Examples 21–41. Each of the respective materials was packed in a regenerator for the second cooling stage of the GM refrigerator as the same manner as in Example 19. Then, the refrigerating tests were carried out, and initial values of the refrigerating capacities at temperature of 4 K were measured. The results are shown in Table 1 as indicated hereunder. In addition, the data of Example 20 are also indicated in Table 1.

TABLE 1

|  | Composition | Refrigerating Capacity of 4.2 K (W) | Specific Heat (J/kcm$^3$) |
| --- | --- | --- | --- |
| Example 20 | $GdAlO_3$ | 0.53 | 0.12 (at 4.5 K) |
| Example 21 | $Gd_{0.9}Tb_{0.1}AlO_3$ | 0.79 | 0.32 (at 4.5 K) |
| Example 22 | $Gd_{0.9}Dy_{0.1}AlO_3$ | 0.81 | 0.37 (at 5.0 K) |
| Example 23 | $Gd_{0.85}Tb_{0.15}FeO_3$ | 0.72 | 0.47 (at 5.5 K) |
| Example 24 | $Gd_{0.9}Ho_{0.1}FeO_3$ | 0.88 | 0.46 (at 5.0 K) |
| Example 25 | $Gd_{0.8}Er_{0.2}FeO_3$ | 0.69 | 0.52 (at 5.5 K) |
| Example 26 | $GdAlO_{0.7}Fe_{0.3}O_3$ | 0.77 | 0.38 (at 4.5 K) |
| Example 27 | $GdAlO_{0.75}Co_{0.25}O_3$ | 0.78 | 0.47 (at 5.0 K) |
| Example 28 | $GdAlO_{0.75}Mn_{0.25}O_3$ | 0.74 | 0.55 (at 5.5 K) |
| Example 29 | $GdAlO_{0.7}Ga_{0.3}O_3$ | 0.71 | 0.36 (at 4.5 K) |
| Example 30 | $GdFe_{0.75}Ti_{0.25}O_3$ | 0.69 | 0.42 (at 5.0 K) |
| Example 31 | $GdFe_{0.7}V_{0.3}O_3$ | 0.69 | 0.49 (at 5.5 K) |
| Example 32 | $GdFe_{0.7}Cr_{0.3}O_3$ | 0.69 | 0.55 (at 5.5 K) |
| Example 33 | $GdFe_{0.75}Ni_{0.24}O_3$ | 0.67 | 0.40 (at 5.0 K) |
| Example 34 | $GdAl_{0.95}Zr_{0.05}O_3$ | 0.74 | 0.38 (at 4.5 K) |
| Example 35 | $GdAl_{0.9}Nb_{0.10}O_3$ | 0.80 | 0.36 (at 4.5 K) |
| Example 36 | $GdAl_{0.8}Mo_{0.20}O_3$ | 0.77 | 0.43 (at 5.0 K) |
| Example 37 | $GdFe_{0.75}Sn_{0.25}O_3$ | 0.73 | 0.48 (at 5.5 K) |
| Example 38 | $GdFe_{0.75}Ta_{0.25}O_3$ | 0.84 | 0.53 (at 5.5 K) |
| Example 39 | $GdFe_{0.7}W_{0.3}O_3$ | 0.71 | 0.43 (at 5.0 K) |
| Example 40 | $Gd_{0.9}Pr_{0.1}AlO_3$ | 0.75 | 0.26 (at 4.5 K) |
| Example 41 | $Gd_{0.85}Sm_{0.15}CoO_3$ | 0.71 | 0.32 (at 4.5 K) |

As is clear from the results shown in Table 1, according to the refrigerators using the cold accumulating materials of the respective Examples that were manufactured through the heat plasma method by suitably controlling the compositions of the magnetic particles, it was confirmed that each of the cold accumulating materials had a large specific heat at low temperature range and capable of exhibiting an excellent refrigerating capacity.

Although the composition of the cold accumulating material of Example 29 satisfied the aforementioned general formula (4), the specific heat at temperature of 4.5 K was low. However, when the material of Example 29 was combined with a cold accumulating material having another specific heat characteristic, there was a possibility of realizing a higher refrigerating capacity. On the other hand, although the composition of the cold accumulating material of Example 30 was outside the composition range specified in the aforementioned general formula (4), the specific heat at temperature of 4.5 K was high. In contrast, the cold accumulating material of Example 20 was confirmed to have a small specific heat at low temperature range, so that the refrigerating capacity was insufficient.

Figure 2:
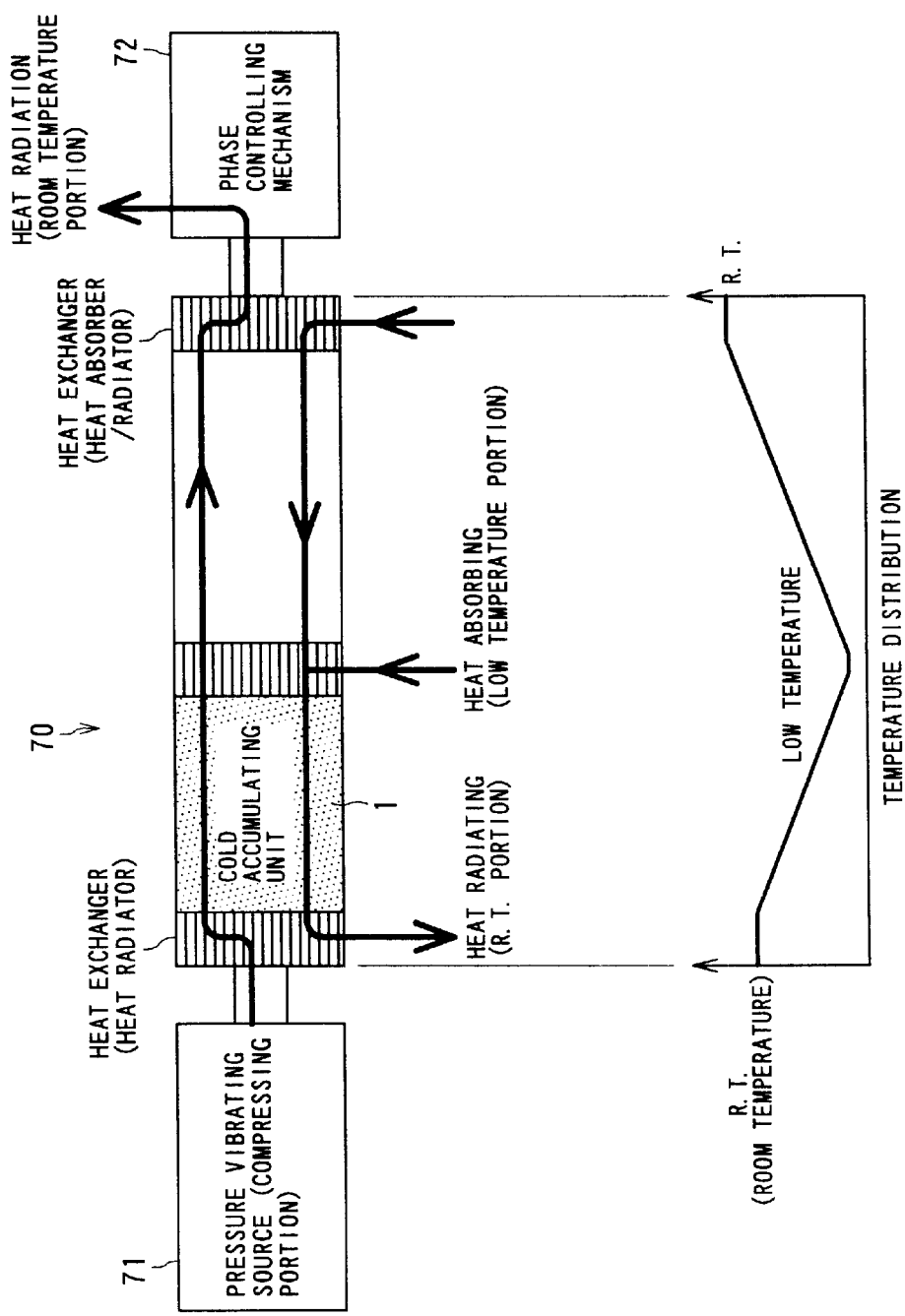
FIG. 2 is a schematic view showing an elemental structure and a temperature distribution in a pulse-tube type refrigerator.

Although the aforementioned Examples have been explained by taking examples in which the cold accumulating material of the present invention is applied to GM refrigerator, the cold accumulating material of the present invention can be also applied to a pulse-tube type refrigerator 70 as shown in FIG. 2.

That is, FIG. 2 shows a basic structure of a pulse-tube type refrigerator having one cooling stage. The most characterizing structural feature of this pulse-tube type refrigerator 70 is that the refrigerator 70 do not comprise a reciprocating piston for generating a cold heat though the reciprocating piston which is an essential component for GM refrigerator as described hereinbefore. Therefore, the pulse-tube type refrigerator has advantages of being excellent in mechanical reliability and low-vibration characteristic, so that the pulse-tube type refrigerator has been expected to be used as a refrigerator for effectively cooling elements and sensors or the like.

The pulse-tube type refrigerator 70 is classified into one kind of cold accumulation refrigerators and generally uses helium gas as the cooling medium gas. As a basic structure, the refrigerator comprises the regenerator (cold accumulating unit) 1, a pressure vibrating source 71 for compressing the helium gas, and a phase controlling mechanism 72 for controlling a time difference between a pressure-fluctuation and a positional fluctuation (displacement) of the cooling medium gas.

In the GM refrigerator or Starling refrigerator, the above phase controlling mechanism 72 corresponds to a reciprocating piston mechanism provided to a low temperature portion. In contrast, in the pulse-tube type refrigerator 70, the phase controlling mechanism 72 is provided to a room temperature portion, and a low temperature end portion of the regenerator (cold accumulating unit) 1 is connected to the room temperature portion of the phase controlling mechanism 72 through a pipe, so called "pulse-tube", whereby the phase of the pressure-wave of the cooling medium gas is remotely controlled. When a transfer of entropy between cooling medium gas and the cold accumulating material due to the pressure fluctuation is advanced in an appropriate timing with the displacement of the cooling medium gas, the entropy is successively drawn up in one direction, so that a cold heat having a lower temperature can be obtained at the low temperature portion of the regenerator (cold accumulating unit) 1.

Next, embodiments of a super-conductive MRI apparatus, a super-conducting magnet for magnetic floating train, a cryopump, and an in-magnetic field type single crystal pull-up apparatus of the present invention, will be described.

Figure 12:
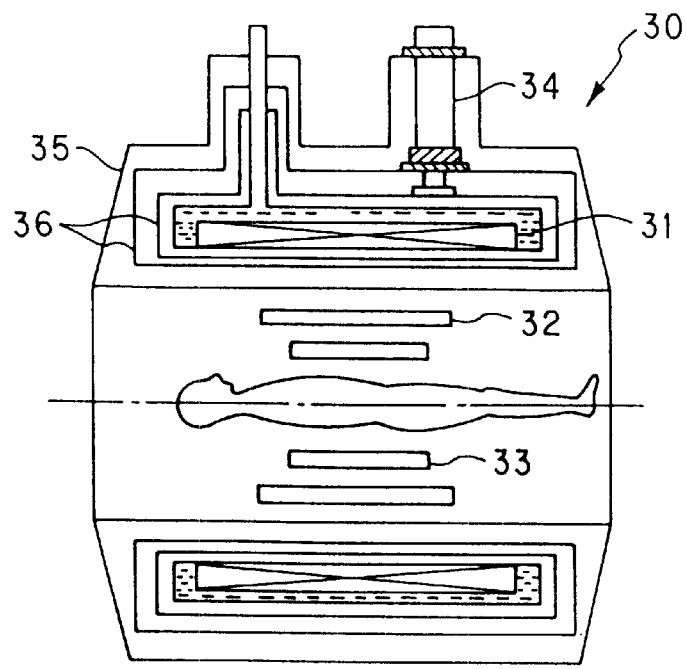
FIG. 12 is a cross sectional view outlining the structure of a super-conductive MRI apparatus according to one embodiment of the present invention.

FIG. 12 is a cross sectional view outlining a structure of a super-conductive MRI apparatus to which the present invention is applied. The super-conductive MRI apparatus 30 shown in FIG. 12 is constituted of a super-conductive magneto-static field coil 31 for biasing a spatially homogeneous and a temporally stable magneto-static field to a human body, a not shown compensating coil for compensating inhomogeneity of generating magnetic field, a gradient magnetic field coil 32 for providing a magnetic field gradient in a measuring region, and a probe for radio wave transducer 33. And, to cool the super-conductive magnetostatic field coil 31, the above described cold accumulation refrigerator 34 of the present invention is employed. Incidentally, in the figure, numeral 35 denotes a cryostat, numeral 36 denotes a radiation shield.

In the super-conductive MRI apparatus 30 wherein a cold accumulation refrigerator 34 of the present invention is applied, since an operating temperature of the super-conductive magneto-static field coil 31 can be guaranteed to be stable over a long term, a spatially homogeneous and temporally stable magneto-static field can be obtained over a long term. Therefore, performance of a super-conductive MRI apparatus 30 can be exhibited with stability over a long term.

Figure 13:
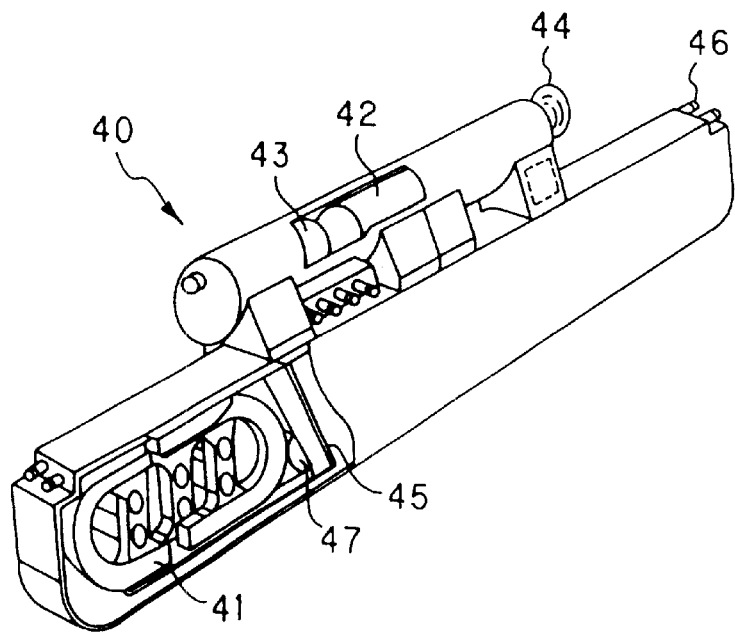
FIG. 13 is a perspective view outlining the essential structure of a super-conducting magnet (for magnetic floating train) according to one embodiment of the present invention.

FIG. 13 is a perspective view outlining a structure of an essential portion of a super-conducting magnet for magnetic floating train (magnetic levitation train) in which the cold accumulation refrigerator of the present invention is applied, a portion of a super-conductive magnet 40 for a magnetic floating train being shown. The super-conductive magnet 40 for a magnetic floating train shown in FIG. 13 is constituted of a super-conductive coil 41, a liquid helium tank 42 for cooling the super-conductive coil 41, a liquid nitrogen tank 43 for preventing evaporation of the liquid helium and a cold accumulating type refrigerator 44 of the present invention. Incidentally, in the figure, numeral 45 denotes a laminated adiathermic material, numeral 46 denotes a power lead, numeral 47 denotes a persistent current switch.

In a super-conductive magnet 40 for a magnetic floating train wherein a cold accumulation refrigerator 44 of the present invention is employed, since the operation temperature of the super-conductive coil 41 can be guaranteed to be stable over a long term, a magnetic filed necessary for magnetic levitation and propulsion of a train can be obtained over a long term with stability. In particular, although acceleration operates in the super-conductive magnet 40 for a magnetic floating (levitation) train, the cold accumulation refrigerator 44 of the present invention, being able to maintain an excellent refrigeration performance over a long term even when the acceleration is operated, can remarkably contribute to the long term stability of the magnetic field and the like. Therefore, a magnetic floating train in which such a super-conductive magnet 40 is employed can exhibit its reliability over a long term.

Figure 14:
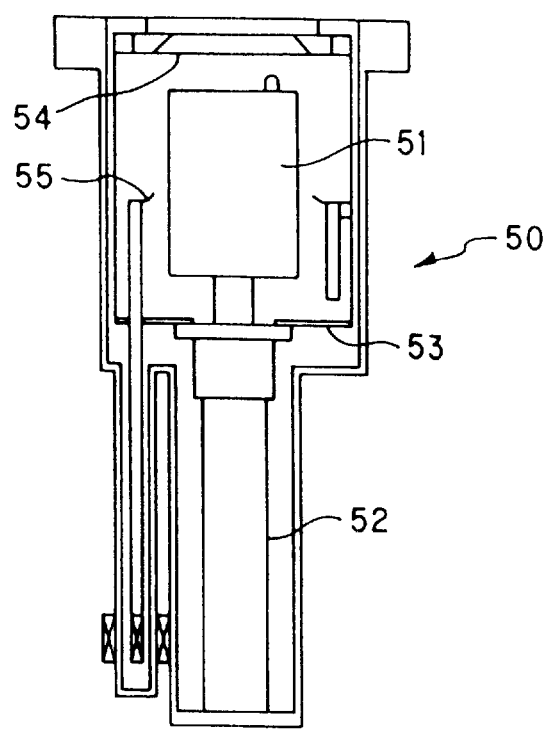
FIG. 14 is a cross sectional view outlining the structure of a cryopump according to one embodiment of the present invention.

FIG. 14 is a cross sectional view outlining a structure of a cryopump to which a cold accumulation refrigerator of the present invention is applied. A cryopump 50 shown in FIG. 14 is constituted of a cryopanel 51 for condensing or absorbing gas molecules, a cold accumulation refrigerator 52 of the present invention for cooling the cryopanel 51 to a predetermined extremely low temperature, a shield 53 disposed therebetween, a baffle 54 disposed at an intake nozzle, and a ring 55 for varying exhaust speed of Argon, nitrogen, hydrogen gas or the like.

With a cryopump 50 involving the cold accumulation refrigerator 52 of the present invention, the operating temperature of the cryopanel 51 can be guaranteed to be stable over a long term. Therefore, the performance of the cryopump 50 can be exhibited over a long term with stability.

Figure 15:
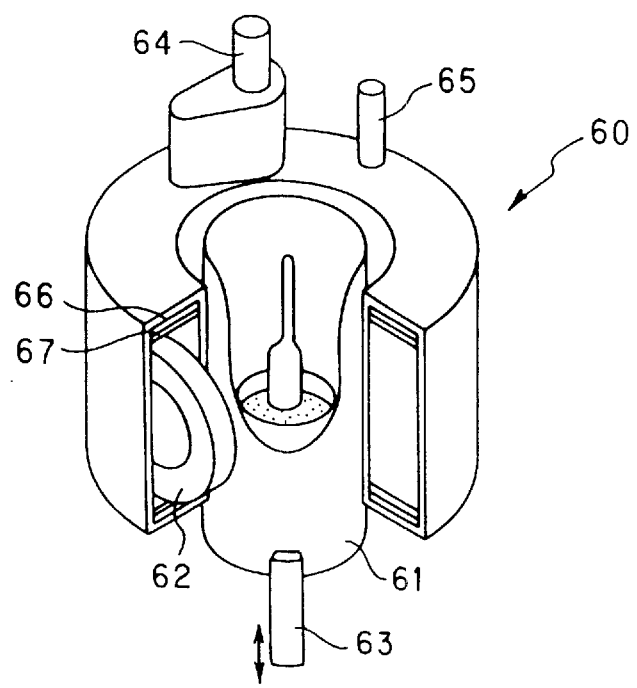
FIG. 15 is a perspective view outlining the essential structure of an in-magnetic field type single crystal pull-up apparatus (magnetic field applied Czocralski) according to one embodiment of the present invention.
Figure 16:
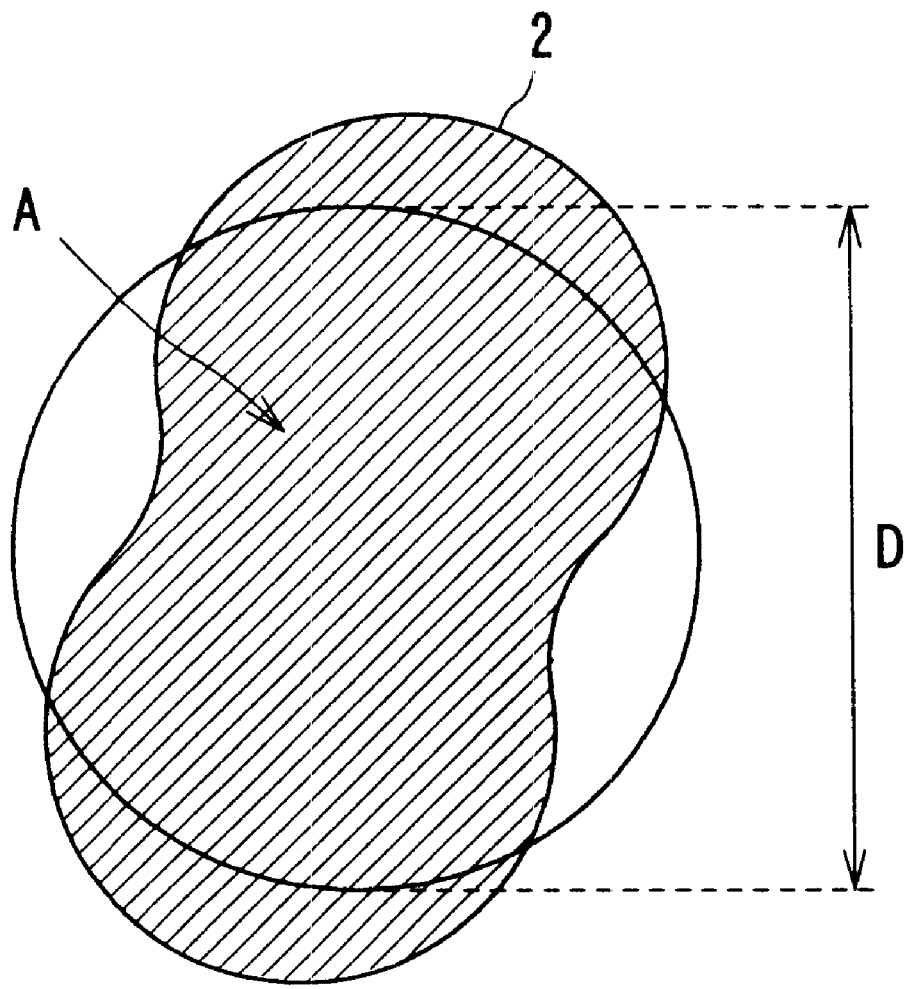
FIG. 16 is an explanatory view showing a method of measuring an equivalent circle diameter of a crystal grain in the cold accumulating material of the present invention.

FIG. 15 is a perspective view outlining a structure of an in-magnetic field type single crystal pull-up apparatus involving the cold accumulation refrigerator of the present invention. The in-magnetic field type single crystal pull-up apparatus 60 shown in FIG. 15 is constituted of a crucible for melting raw material, a heater, a single crystal pull-up portion 61 possessing a mechanism of pulling up a single crystal, a super-conductive coil 62 for applying a magnetostatic field to a raw material melt, and an elevation mechanism 63 of the single crystal pulling up portion 61. And, as a cooling means of the super-conductive coil 62, the above described cold accumulation type refrigerator 64 of the present invention is employed. Now, in the figure, numeral 65 denotes a current lead, numeral 66 denotes a heat shielding plate, numeral 67 denotes a helium container.

With the in-magnetic field type single crystal pull-up apparatus (magnetic field applied Czochralski) 60 involving a cold accumulation refrigerator 64 of the present invention, since the operating temperature of the super-conductive coil 62 can be guaranteed to be stable over a long term, a good magnetic field for suppressing convection of the raw material melt of the single crystal can be obtained over a long term. Therefore, the performance of the in-magnetic field application type single crystal pull-up apparatus 60 can be exhibited with stability over a long term.

As is evident from the above described embodiments, according to the cold accumulating material of the present invention constructed as above, the equivalent circle diameter of the crystal grain, density, amount of additives (composition), amount of impurities, amount of defects such as crack and pore or void or the like are specified to a predetermined range, so that there can be provided the cold accumulating material having a high mechanical strength, a high thermal conductivity and an excellence in a thermal shock resistance, and having no fear of being finely pulverized.

Therefore, even if the cold accumulating material is used as a cold accumulating material for the refrigerators such as Starling refrigerator and a pulse-tube type refrigerator to be operated with a high speed, a pressure loss at the regenerator is small and there can be provided a cold accumulating material capable of exhibiting a stable refrigerating performance for a long time of period.

Further, when the above cold accumulating material is used as at least part of a cold accumulating material for the refrigerator, there can be provided a refrigerator having a high refrigerating performance at low temperature range, and capable of maintaining a stable refrigerating performance for a long time.

Furthermore, in an MRI apparatus, a cryopump, a super-conducting magnet for magnetic floating train, and a in-magnetic field single crystal pull-up apparatus (magnetic field applied Czochralski), since, in all of them, performance of the refrigerator dominates the performance of each apparatus, an MRI apparatus, a cryopump, a super-conducting magnet for magnetic floating train, and an in-magnetic field single crystal pull-up apparatus in which the above described refrigerators are assembled therein can exhibit excellent performances for a long term.

What is claimed is:

1. A cold accumulating material comprising a number of magnetic particles mainly composed of oxide, wherein an average value of equivalent circle diameters of crystal grains constituting the magnetic particles is 0.3–20 $\mu$m.

2. A cold accumulating material according to claim 1, wherein an area ratio of the crystal grains each having an equivalent circle diameter of 50 $\mu$m or more is 10% or less with respect to whole crystal grains constituting said magnetic particle.

3. A cold accumulating material according to claim 1, wherein said magnetic particles are composed of sintered bodies of granulated grains and sintering density of the sintered bodies is 86–99.8%.

4. A cold accumulating material according to claim 1, wherein said magnetic particles contain at least one element selected from the group consisting of Y, Mg, Al, Ca and rare earth elements in a range of 0.5–15 wt % calculated as oxide thereof, the selected elements being different from elements constituting said magnetic particles.

5. A cold accumulating material according to claim 1, wherein a ratio of the magnetic particles each of which surface is formed with at least two cracks each having a length of 10 µm or more is 20% or less with respect to whole number of the magnetic particles.

6. A cold accumulating material according to claim 1, wherein a ratio of the magnetic particles each of which surface roughness in terms of maximum height ($R_{max}$) is 10 µm or more is 30% or less with respect to whole number of the magnetic particles.

7. A cold accumulating material according to claim 1, wherein a ratio of the magnetic particle in which void or pore having a maximum width of 20 µm or more exist is 40% or less with respect to whole number of the magnetic particles.

8. A cold accumulating material according to claim 1, wherein said magnetic particles contain 3 ppm-2 wt % of silicon, sodium and iron in total amount thereof.

9. A cold accumulating material according to claim 1, wherein said magnetic particles are composed of oxide magnetic particles expressed by a general formula of $Gd_{1-x}R_xA_{1-y}B_yO_3$ wherein R denotes at least one of rare earth element selected from the group consisting of Ce, Pr, Nd, Pm, Sm, Tb, Dy, Ho and Er, while A denotes at least one element selected from the group consisting of Ti, V, Cr, Mn, Fe, Co, Ni, Cu, Zn, Ga, Ge, Al and Si, at least two elements being selected as A component in a case of x=0 and y=0, while at least one element being selected as A component in a case of x≠0 or y≠0, B denotes at least one element selected from the group consisting of Zr, Nb, Mo, Ag, In, Sn, Sb, Hf, Ta, W, Au, and Bi, and x in atomic ratio satisfies a relation: $0 \leq x \leq 0.4$, while y in atomic ratio satisfies a relation: $0 \leq x \leq 0.4$.

10. A cold accumulating material according to claim 1, wherein said magnetic particles are composed of oxide magnetic particles having at least one property selected from: a property exhibiting a specific heat of 0.3 J/K cm³ or more in a temperature range of 4.0–5.0 K; a property exhibiting a specific heat of 0.35 J/K cm³ or more in a temperature range of 4.5–5.5 K; and a property exhibiting a specific heat of 0.4 J/K cm³ or more in a temperature range of 5.5–6.0 K.

11. A cold accumulation refrigerator comprising a regenerator filled with a cold accumulating material through which a cooling medium gas flows from a high temperature upstream side of the regenerator, so that heat is exchanged between the cooling medium gas and the cold accumulating material packed in the regenerator thereby to obtain a lower temperature at a downstream side of the regenerator, wherein at least part of the cloud accumulating material packed in the regenerator is composed of the cold accumulating material as set forth in claim 1.

12. A cold accumulation refrigerator comprising a regenerator filled with a cold accumulating material through which a cooling medium gas flows from a high temperature upstream side of the regenerator, so that heat is exchanged between the cooling medium gas and the cold accumulating material packaged in the regenerator thereby to obtain a lower temperature at a downstream side of the regenerator, wherein the high temperature side of the regenerator is packed with a cold accumulating material composed of non-oxide substance, while the low temperature side of the regenerator is packed with the cold accumulating material as set forth in claim 1.

13. A cold accumulation refrigerator according to claim 12, wherein said cold accumulating material composed of non-oxide substance is at least one of Pb, $HoCu_2$, and $Er_3Ni$.

14. A super-conducting magnet comprising a cold accumulation refrigerator as set forth in claim 11.

15. An MRI (Magnetic Resonance Imaging) apparatus comprising a cold accumulation refrigerator as set forth in claim 11.

16. A cryopump comprising a cold accumulation refrigerator as set forth in claim 11.

17. An in-magnetic field single crystal pull-up apparatus comprising a cold accumulation refrigerator as set forth in claim 11.

* * * * *